US 7,644,602 B2

(12) United States Patent
Umeda

(10) Patent No.: US 7,644,602 B2
(45) Date of Patent: Jan. 12, 2010

(54) METHOD OF MEASURING TRANSVERSE SENSITIVITY OF SENSOR FOR DETECTING ACCELERATION AND ACCELERATION MEASURING METHOD

(75) Inventor: Akira Umeda, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/594,317

(22) PCT Filed: Mar. 31, 2005

(86) PCT No.: PCT/JP2005/006840

§ 371 (c)(1),
(2), (4) Date: Aug. 17, 2007

(87) PCT Pub. No.: WO2005/095998

PCT Pub. Date: Oct. 13, 2005

(65) Prior Publication Data

US 2007/0295087 A1 Dec. 27, 2007

(30) Foreign Application Priority Data

Mar. 31, 2004 (JP) ............................. 2004-102736

(51) Int. Cl.
*G01P 21/00* (2006.01)
(52) U.S. Cl. ..................................................... 73/1.38
(58) Field of Classification Search ................ None
See application file for complete search history.

(56) References Cited

U.S. PATENT DOCUMENTS 6,337,688 B1    1/2002  Berstis
2005/0257616 A1*  11/2005  Kozlov et al. ............ 73/514.16

FOREIGN PATENT DOCUMENTS

JP    06-331647    12/1994
JP    07-242112    9/1995
JP    09-043269    2/1997

(Continued)

OTHER PUBLICATIONS

J.C. Lotters et al. "Procedure for in-use calibration triaxial accelerometers in medical applications," Sensors and Actuators A 68, pp. 221-228, 1998.

(Continued)

*Primary Examiner*—Robert R Raevis
(74) *Attorney, Agent, or Firm*—Finnegan, Henderson, Farabow, Garrett & Dunner, LLP

(57) ABSTRACT

A sensor obtains transverse sensitivity in a sensitivity matrix of an acceleration sensor with a uniaxial vibration generator. The acceleration is measured by vibrating the table 12. As the measurement of the main axis sensitivity, transverse sensitivity $S_{zx}$ associated with the X-axis is obtained from measured results of the acceleration sensor 5 and measured results of a measuring instrument for measuring the surface motion of the table 12 independently. Likewise, transverse sensitivity $S_{zy}$ associated with the Y-axis is obtained by fixing on the table 12 the cubical block on which the acceleration sensor 5 is mounted in such a manner that the Y-axis direction defined with respect to the acceleration sensor 5 aligns with the vibration direction of the table 12.

9 Claims, 22 Drawing Sheets

FOREIGN PATENT DOCUMENTS

| | | |
|---|---|---|
| JP | 2000-338128 | 12/2000 |
| JP | 2000-356647 | 12/2000 |
| JP | 2003-101033 | 4/2003 |
| JP | 2004-093552 | 3/2004 |

OTHER PUBLICATIONS

Akira Umeda et al., "Laser Kanshokei to Sanjigen Shindodai ni yoru Sanjiku Kasokudo sensor noSanjigen Kasokudo Sensor to Shinteno Kosei Hoho", The Japan Societu of Mechanical Engineers, Shindo Onkyo Shin Gijutisu Symposium Koen Ronbunshu, 2003 pp. 67 to 70 (Only Abstract is translated).

ISO5347-11:1993(E), "Methods for the calibration of vibration and shock pick-ups—Part 11: Testing of transverse vibration sensitivity", International Standard, pp. 296-297, (1993).

ISO16063-11:1999(E),"Methods for the calibration of vibration and shock transducers—Part 11: Primary vibration calibration by laser interferometry", International Standard, pp. iii-iv and 1-27, (1999).

ISO 5347-1:1993(E), "Methods for the calibration of vibration and shock pick-ups—Part 1: Primary vibration calibration by laser interferometry", International Standard, pp. 233-245, (1993).

ISO 2041 : 1990 (E/F), "Vibration and Shock—Vocabulary", International Standard, pp. 47-105, (1990).

Akira Umeda et al., "Revisit the Calibration of Inertia Sensors", the Transactions E of the Institute of Electrical Engineers of Japan, vol. 125, pp. 108-117, (2005), Abstract.

Akira Umeda et al.,"Calibration of three-axis accelerometers using a three-dimensional vibration generator and three laser interferometers", Sensors and Actuators A, pp. 93-101, (2004), Abstract.

Akira Umeda et al., Calibration of Three-axis Accelerometers as a Three-Dimensional Accelerometer Using a Three-Dimensional Vibration Generator and Laser Interferometers, Metrology Institute of Japan, National Institute of Advanced Industrial Science and Technology, pp. 38-45, (2004), Abstract.

Alan Lai et al. "Semi-automatic calibration technique using six inertial frames of reference," Proceedings of SPIE, vol. 5274, pp. 531-542, 2003.

W. H. Press, S. A. Teukolsky, W. T. Vetterling and B. P. Flannery, Numerical Recipes in C, Second Edition, Cambridge University Press, USA, 1992, pp. 32-104.

W. H. Press, S. A. Teukolsky, W. T. Vetterling and B. P. Flannery, Numerical Recipes in C, Second Edition, Cambridge University Press, USA, 1992, pp. 394-455.

\* cited by examiner

METHOD OF MEASURING TRANSVERSE SENSITIVITY OF SENSOR FOR DETECTING ACCELERATION AND ACCELERATION MEASURING METHOD

TECHNICAL FIELD

The present invention relates to a method of measuring transverse sensitivity of a sensor for detecting acceleration and an acceleration measuring method. A technical field of the present invention relates to a field in which measurement of motion is essential such as measuring responses to vibrations involved in vehicle collision safety, car suspension control, robots, transportation equipment, equipment relating to atomic power generation, shipping, aerospace equipment, information equipment and human bodies, and measuring acceleration in ambient vibration. The term "acceleration" here means not only translational acceleration but also angular acceleration and angular velocity. As for multi-axial sensors, those that detect the translational acceleration and angular acceleration simultaneously are referred to as o-axial acceleration sensor, but those that detect the translational acceleration and angular velocity simultaneously are sometimes referred to as o-axial motion sensor (where o refers to the number of axes).

BACKGROUND ART

As sensors for detecting acceleration, are known acceleration sensors, inertia sensors and the like. The present invention also covers semiconductor accelerometers with gyroscopic functions and angular acceleration measuring functions. Unless otherwise specified, the following description is made using the term "accelerometer/acceleration sensor" for a sensor for detecting acceleration.

FIGS. 1A-1D each show a widely practiced calibration method of an accelerometer/acceleration sensor. In terms of international standards, they are methods described in ISO 16063-11 or ISO 5347 Part 1. FIG. 2 shows a method of measuring transverse sensitivity described in ISO 5347 Part 11.

FIG. 1A shows a calibration method carried out by mounting a single-ended uniaxial acceleration sensor (accelerometer) 1 on a table 2a of a uniaxial vibration generator 2 for generating translational motion (the table 2a vibrates in the direction of the two-directional arrow in FIG. 1A with respect to the body 2b), by measuring the motion of the table with a laser interferometer (not shown) with aligning the motion direction of the uniaxial vibration generator 2 with the sensing axis of the uniaxial acceleration sensor 1, and by comparing measured results by the laser interferometer with the output of the acceleration sensor 1. It functions as a primary calibration method. The term "single-ended accelerometer" refers to an accelerometer with only one mounting surface. On the other hand, the term "double-ended accelerometer" refers to an accelerometer for calibration, which has two mounting surfaces and can undergo back-to-back coupling.

FIG. 1B shows a calibration method carried out by mounting a double-ended uniaxial acceleration sensor (accelerometer) 3 on the table of the uniaxial vibration generator 2, by measuring the motion of the table with the laser interferometer with aligning the motion direction of the uniaxial vibration generator with the sensing axis of the uniaxial acceleration sensor 3, and by comparing measured results by the laser interferometer with the output of the acceleration sensor 3. It also functions as a primary calibration method.

FIG. 1C shows a calibration method carried out by coupling the double-ended reference acceleration sensor 3 calibrated by the method of FIG. 1B and the calibration target acceleration sensor 1 in series with aligning their sensitivity axes, by moving them with aligning their sensitivity axes with the motion direction of the vibration generator, and by comparing the output of the reference accelerometer 3 with the output of the calibration target accelerometer 1. It functions as a secondary calibration method.

FIG. 1D shows a primary calibration method of an angular acceleration detecting acceleration sensor corresponding to the method shown in FIG. 1A. The reference numeral 25 designates a uniaxial vibration generator for generating vibration angular acceleration. A disk-shaped table 25a carries out rotational vibration in the directions of the two-directional arrow in FIG. 1D with respect to the body 25b. An angular acceleration detecting acceleration sensor (angular acceleration sensor) 26 is mounted on the table 25a of the uniaxial vibration generator 25 for generating the vibration angular acceleration in such a manner that the central axis (the central axis agrees with the sensing axis) comes into the center of the table 25a and becomes perpendicular to the table 25a. The table 25a has an optical diffraction grating formed on its side. To measure the vibration angular acceleration of the table 25a, the optical diffraction grating on the outer edge of the table 25a is irradiated horizontally with the laser from the laser interferometer. The primary calibration is conducted by applying the vibration angular acceleration around the sensing axis of the angular acceleration sensor 26 by carrying out the rotational vibration of the table 25a, and by comparing the vibration angular acceleration detected from the changes in the reflected light of the laser radiating the optical diffraction grating of the table 25a with the output signal of the calibration target angular acceleration sensor 26. It is a method described in a standard being prepared now by ISO. The method enables the calibration of the reference angular acceleration sensor. Thus, it can function as the secondary calibration as the method shown in FIG. 1C by mounting the reference angular acceleration sensor and calibration target angular acceleration sensor on the uniaxial vibration generator for generating the vibration angular acceleration with aligning their axes. In the existing circumstances, no reference acceleration sensor for vibration angular acceleration exists. This is because its standard is yet to be completed, or no production is present which is experimentally demonstrated that it functions as a reference acceleration sensor for the vibration angular acceleration.

Next, a method will be described of obtaining the transverse sensitivity as shown in FIG. 2 and described in ISO 5347-11: 1993 "Methods for the calibration of vibration and shock pick-ups—Part 11: Testing of transverse sensitivity".

On a plane normal to the sensing axis of the acceleration sensor 1 for detecting the translational acceleration, vibration acceleration A sin ωt is applied (indicated by the arrow 4 in FIG. 2). Normalizing the obtained sensitivity by the main axis sensitivity gives the transverse sensitivity. According to the ISO standard, the transverse sensitivity is obtained with varying, an angle θ (the angle between the direction of the vibration acceleration 4 and a marking 5 put to the reference position of the acceleration sensor 1 on the plane normal to the sensing axis of the acceleration sensor 1). Then it instructs to report the transverse sensitivity value and angle $\theta_{max}$ when the maximum value is obtained, and the transverse sensitivity value and angle $\theta_{min}$ when the minimum value is obtained. In a word, the number of the transverse sensitivity parameters is one in the ISO 5347-11: 1993 "Methods for the calibration of vibration and shock pick-ups—Part 11: Testing of transverse sensitivity".

DISCLOSURE OF THE INVENTION

Problems to Be Solved by the Invention

Problems of the foregoing method as shown in FIGS. 1A-1D are as follows. A first problem is that the accelerometer/acceleration sensor is a device for measuring the acceleration as described in ISO 2041 Vibration and shock terminology, and that the acceleration is a vector quantity as taught by elementary physics or written in the standard. In contrast to this, it is obvious that the methods as shown in FIGS. 1A-1D are not calibration based on the vector. This is because although the vector is a quantity possessing both the magnitude and direction, the methods as shown in FIGS. 1A-1D provide the acceleration sensors with the information about the direction from the beginning. Nevertheless, even the International Bureau of Weights and Measures employs the methods as shown in FIGS. 1A-1D in the international comparison using the translational vibration acceleration, which results in such high accuracy that differs only in the fourth or fifth digit. It is generally understood that it guarantees the measurement accuracy of the accelerometer/acceleration sensor. However, this is a clear mistake. Even in Japan, however, an official opinion states that "Industrially, the vibration measurement and acceleration measurement are nearly identical". Thus, the condition continues that the confusion is amplified rather than the correct understanding is required of the industrial world.

As long as the physical quantity acceleration is a vector, measurement of the acceleration must mean measurement of both the magnitude and direction. This is because an accelerometer is a device for measuring acceleration as stated in ISO 2041 vibration and shock—vocabulary. Thus, the method as shown in FIG. 2 cannot measure the magnitude and direction because the number of the parameters is only one.

Therefore an object of the present invention is to provide a method of measuring the sensitivity of a sensor for detecting acceleration as a vector and an acceleration measuring method, which can eliminate the foregoing problem concerning both the translational vibration acceleration and vibration angular acceleration.

Means for Solving the Problem

According to one aspect of the present invention, there is provided a method comprising: applying vibration acceleration to at least one sensor which is fixed, via a jig, on a uniaxial vibration generator for generating translational motion, and which detects acceleration with the vibration generator; and calculating transverse sensitivity, one of elements of a sensitivity matrix of the sensor, from an output value of the sensor obtained by the application of the vibration acceleration, and from a measurement value of input acceleration to the sensor obtained by measuring the input acceleration with a measuring instrument independent of the sensor during the application, wherein the application is carried out in a state in which a coordinate axis of a coordinate system of a space defining the input acceleration to the sensor is aligned with a direction of the vibration by adjusting the jig.

According to another aspect of the present invention, there is provided a method comprising: applying vibration acceleration to a sensor which is fixed, via a jig, on a uniaxial vibration generator for generating translational motion, and which detects at least one of translational acceleration, rotational angular velocity and rotational angular acceleration with the vibration generator; and calculating transverse sensitivity, one of elements of a sensitivity matrix of the sensor, from an output value of the sensor obtained by the application of the vibration acceleration, and from a measurement value of input acceleration to the sensor obtained by measuring with a measuring instrument independent of the sensor during the application; wherein the application is carried out in a state in which a coordinate axis of a three-axis Cartesian coordinate system of a space defining the input acceleration to the sensor is aligned with a direction of the vibration by adjusting the jig.

According to still another aspect of the present invention, there is provided a method comprising: applying vibration acceleration to at least one sensor which is fixed, via a jig, on a uniaxial vibration generator for generating rotational vibration motion, and which detects acceleration with the vibration generator; and calculating transverse sensitivity, one of elements of a sensitivity matrix of the sensor, from an output value of the sensor obtained by the application of the vibration acceleration, and from a measurement value of input acceleration to the sensor obtained by measuring the input acceleration with a measuring instrument independent of the sensor during the application, wherein the application is carried out in a state in which a coordinate axis of a coordinate system of a space defining the input acceleration to the sensor is aligned with a direction of a rotational axis of the vibration by adjusting the jig.

According to still another aspect of the present invention, there is provided a method comprising: applying vibration acceleration to a sensor which is fixed, via a jig, on a uniaxial vibration generator for generating rotational vibration motion, and which detects at least one of translational acceleration, rotational angular velocity and rotational angular acceleration with the vibration generator; and calculating transverse sensitivity, one of elements of a sensitivity matrix of the sensor, from an output value of the sensor obtained by the application of the vibration acceleration, and from a measurement value of input acceleration to the sensor obtained by measuring with a measuring instrument independent of the sensor during the application; wherein the application is carried out in a state in which a coordinate axis of a three-axis Cartesian coordinate system of a space defining the input acceleration to the sensor is aligned with a direction of a rotational axis of the vibration by adjusting the jig.

According to still another aspect of the present invention, there is provided a method comprising: calculating the transverse sensitivity, one of elements of a sensitivity matrix of the sensor for detecting acceleration, from the transverse sensitivity which is associated with at least one sensor for detecting the acceleration and is measured by the foregoing two methods.

According to still another aspect of the present invention, there is provided a method comprising: calculating the transverse sensitivity, one of elements of a sensitivity matrix of the sensor for detecting acceleration, from the transverse sensitivity which is associated with a sensor for detecting at least one of the translational acceleration, rotational angular velocity and rotational angular acceleration and is measured by the foregoing two methods.

Here, the sensor may have a casing comprising planes perpendicular to at least two coordinate axes of a coordinate system of a space defining input acceleration to the sensor.

The measuring instrument may comprise a laser interferometer for carrying out laser irradiation of the planes of the sensor.

In addition, the sensor can have a casing comprising an irradiation surface formed on a plane including a rotational axis of the sensor or on a plane parallel to the rotational axis; and the measuring instrument can comprise a laser interferometer for carrying out laser irradiation of two locations on the irradiation surface of the sensor in the foregoing methods.

Furthermore, the sensor can have a casing comprising a diffraction grating around a rotational axis of the sensor; and the measuring instrument can comprise a laser interferometer for carrying out laser irradiation of two locations on the irradiation surface of the sensor in the foregoing methods.

A summary of the transverse sensitivity is as follows: even if the vibration generated by the uniaxial vibration generator is either the translational motion or rotational motion, making the direction of the motion detected by the calibration target acceleration sensor perpendicular to the direction of the motion generated by the vibration generator by using the jig makes it possible to determine the transverse sensitivity between the coordinate axis in the direction of applying the motion caused by the vibration generator and the coordinate axis of the input acceleration corresponding to the output signal of the acceleration sensor. For example, assume that the direction of the motion of the uniaxial vibration generator is the Z-axis direction of the acceleration sensor, and the output signal of interest of the acceleration sensor is brought into correspondence to the X-axis input acceleration signal with the jig. Then, the transverse sensitivity of the Z-axis input to X-axis output can be obtained by measuring the motion acceleration along the Z-axis with an external measuring instrument. In this case, it is possible to apply the translational motion in the Z-axis direction or the rotational motion around the Z-axis independently of whether the X-axis input signal has the sensitivity to the translational motion or to the rotational motion according to the original design. If the vibration angular acceleration is applied around the Z-axis, and the original design is made in such a manner that the X-axis detects the translational vibration acceleration, the transverse sensitivity is obtained which represents the extent of the effect of the rotational motion beyond expectation.

In addition, when N sensors for detecting acceleration are combined to detect N components of the acceleration (where N is an integer equal to or greater than two), the detection accuracy of the acceleration can be improved by multiplying the outputs of the sensors by the inverse matrix of the sensitivity matrix composed of the main axis sensitivity and transverse sensitivities of the sensors, which are obtained by applying one of the foregoing methods to the individual sensors.

Likewise, when obtaining the acceleration with a sensor for detecting at least biaxial acceleration, the detection accuracy of the acceleration can be improved by multiplying the output of the sensor by the inverse matrix of the sensitivity matrix composed of the main axis sensitivity and transverse sensitivity of the sensor, which are obtained by applying one of the foregoing methods to the sensor.

In the present invention, the sensitivity matrix is defined as follows:

First, to measure the acceleration as a vector, it is necessary to consider a mathematical definition of the acceleration sensor.

FIG. 3 is a diagram illustrating a mathematical definition of the function of an acceleration sensor. As shown in FIG. 3, the mathematical function of the accelerometer/acceleration sensor is to project a set of accelerations (vector space) which are vectors in a real motion space into a set of accelerations represented by electric signals (vector space). As long as linearity is assumed, it is a matrix that represents the projection of a vector space into another vector space mathematically. Thus, the sensitivity that represents the conversion ratio physically must become a matrix. Accordingly, obtaining all the components of the matrix expressing the sensitivity enables the correct calibration of the sensor for detecting the acceleration.

What is important in the vector space is a dimension. The term "dimension" refers to the maximum number of linearly independent vectors in the space. Generally, the dimension of the real motion vector space is not necessarily equal to the dimension of the vector space of the acceleration signal represented by an electric signal. Calibration using the vibration generator will mean nothing other than operation of determining the sensitivity of the calibration target acceleration sensor by using the vector space generated by the vibration generator instead of the real motion vector space. Thus, setting the dimension of the vector space generated by the vibration generator greater than the dimension of the real motion vector space is not insignificant physically. For example, defining an acceleration sensor, which is designed to detect the three-dimensional translational acceleration of XYZ, by a six-dimensional vector space, which consists of the three-dimensional translation of XYZ and another three dimensions around the X-axis, Y-axis and Z-axis, has a meaning of estimating an error imposed on the detection of the translational acceleration by the angular acceleration beyond expectation. The present invention can handle such a case.

When the dimension of the real motion vector space, or the number of axes of the acceleration sensor, is equal to the dimension of the vector space generated by the vibration generator, the matrix representing the sensitivity becomes a square matrix. If the dimension of the vector space generated by the vibration generator is greater than the number of the axes, the sensitivity matrix does not become a square matrix. It is not insignificant to obtain the sensitivity matrix in the form of a non-square matrix because it relates to the reliability of the dimension of the vector space to be measured, and has an effect on the estimation of the unreliability of the measurement in the end. Thus, it is an issue deeply involved in the quality of the measurement target. The following description is made about the matrix sensitivity when the dimension of the real motion vector space is equal to the number of the axes of the acceleration sensor.

(In the Case of Uniaxial Acceleration Sensor)

In the case where the acceleration sensor is uniaxial, the acceleration sensor has a single output axis. If the vector space generated by the vibration generator is assumed to be three-dimensional, the sensitivity matrix is defined by the following matrix.

$$(S_{xx} S_{xy} S_{xz}) \quad (1)$$

In expression (1), the output axis is assumed to be the X-axis; $s_{xx}$ is the main axis sensitivity because it represents a ratio of the X-axis output (that is, the output of the acceleration sensor, which also applies to the following) to the X-axis input (which means that the acceleration direction is the X-axis direction, which also applies to the following); $s_{xy}$ is the transverse sensitivity because it represents the ratio of the X-axis output to the Y-axis input; and $s_{xz}$ is the transverse sensitivity because it represents the ratio of the X-axis output to the Z-axis input.

(In the Case of Biaxial Acceleration Sensor)

In the case where the acceleration sensor is biaxial, the acceleration sensor has two output axes. If the vector space generated by the vibration generator is assumed to be three-dimensional, the sensitivity matrix is defined by the following matrix.

$$\begin{pmatrix} S_{xx} & S_{xy} & S_{xz} \\ S_{yx} & S_{yy} & S_{yz} \end{pmatrix} \quad (2)$$

In expression (2), the output axes are assumed that their first axis is the X-axis and second axis is the Y-axis. As to the first axis, $S_{xx}$ is the main axis sensitivity because it represents the ratio of the X-axis output to the X-axis input; $s_{xy}$ is transverse sensitivity because it represents the ratio of the X-axis output to the Y-axis input; and $s_{xz}$ is transverse sensitivity because it represents the ratio of the X-axis output to the Z-axis input. As to the second axis, $s_{yx}$ is transverse sensitivity because it represents the ratio of the Y-axis output to the X-axis input; $s_{yy}$ is the main axis sensitivity because it represents the ratio of the Y-axis output to the Y-axis input; and $s_{yz}$ is transverse sensitivity because it represents the ratio of the Y-axis output to the Z-axis input.

(In the Case of Triaxial Acceleration Sensor)

In the case where the acceleration sensor is triaxial, the acceleration sensor has three output axes. If the vector space generated by the vibration generator is assumed to be three-dimensional, the sensitivity matrix is defined by the following matrix.

$$\begin{pmatrix} S_{xx} & S_{xy} & S_{xz} \\ S_{yx} & S_{yy} & S_{yz} \\ S_{zx} & S_{zy} & S_{zz} \end{pmatrix} \quad (3)$$

In expression (3), the output axes are assumed that their first axis is the X-axis, second axis is the Y-axis and third axis is the Z-axis. As to the first axis, $s_{xx}$ is the main axis sensitivity because it represents the ratio of the X-axis output to the X-axis input; $s_{xy}$ is transverse sensitivity because it represents the ratio of the X-axis output to the Y-axis input; and $s_{xz}$ is transverse sensitivity because it represents the ratio of the X-axis output to the Z-axis input. As to the second axis, $s_{yx}$ is transverse sensitivity because it represents the ratio of the Y-axis output to the X-axis input; $s_{yy}$ is the main axis sensitivity because it represents the ratio of the Y-axis output to the Y-axis input; and $s_{yz}$ is transverse sensitivity because it represents the ratio of the Y-axis output to the Z-axis input. As to the third axis, $s_{zx}$ is transverse sensitivity because it represents the ratio of the Z-axis output to the X-axis input; $s_{zy}$ is transverse sensitivity because it represents the ratio of the Z-axis output to the Y-axis input; and $s_{zz}$ is the main axis sensitivity because it represents the ratio of the Z-axis output to the Z-axis input.

(In the Case of Four-Axial Acceleration Sensor)

In the case where the acceleration sensor is four-axial, the acceleration sensor has four output axes. If the vector space generated by the vibration generator is assumed to be four-dimensional, the sensitivity matrix is defined by the following matrix.

$$\begin{pmatrix} S_{xx} & S_{xy} & S_{xz} & S_{xp} \\ S_{yx} & S_{yy} & S_{yz} & S_{yp} \\ S_{zx} & S_{zy} & S_{zz} & S_{zp} \\ S_{px} & S_{py} & S_{pz} & S_{pp} \end{pmatrix} \quad (4)$$

In expression (4), the output axes are assumed that their first axis is the X-axis, second axis is the Y-axis, third axis is the Z-axis and fourth axis is the p-axis. As to the first axis, $s_{xx}$ is the main axis sensitivity because it represents the ratio of the X-axis output to the X-axis input; $s_{xy}$ is transverse sensitivity because it represents the ratio of the X-axis output to the Y-axis input; $s_{xz}$ is transverse sensitivity because it represents the ratio of the X-axis output to the Z-axis input; and $s_{yx}$ is transverse sensitivity because it represents the ratio of the X-axis output to the p-axis input. As to the second axis, $s_{yx}$ is transverse sensitivity because it represents the ratio of the Y-axis output to the X-axis input; $s_{yy}$ is the main axis sensitivity because it represents the ratio of the Y-axis output to the Y-axis input; $s_{yz}$ is transverse sensitivity because it represents the ratio of the Y-axis output to the Z-axis input; and $s_{yp}$ is transverse sensitivity because it represents the ratio of the Y-axis output to the p-axis input. As to the third axis, $s_{zx}$ is transverse sensitivity because it represents the ratio of the Z-axis output to the X-axis input; $s_{zy}$ is transverse sensitivity because it represents the ratio of the Z-axis output to the Y-axis input; $s_{zz}$ is the main axis sensitivity because it represents the ratio of the Z-axis output to the Z-axis input; and $S_{zp}$ is transverse sensitivity because it represents the ratio of the Z-axis output to the p-axis input. As to the fourth axis, $s_{px}$ is transverse sensitivity because it represents the ratio of the p-axis output to the X-axis input; $s_{py}$ is transverse sensitivity because it represents the ratio of the p-axis output to the Y-axis input; $s_{pz}$ is transverse sensitivity because it represents the ratio of the p-axis output to the Z-axis input; and $s_{pp}$ is the main axis sensitivity because it represents the ratio of the p-axis output to the p-axis input.

(In the Case of Five-Axial Acceleration Sensor)

In the case where the acceleration sensor is five-axial, the acceleration sensor has five output axes. If the vector space generated by the vibration generator is assumed to be five-dimensional, the sensitivity matrix is defined by the following matrix.

$$\begin{pmatrix} S_{xx} & S_{xy} & S_{xz} & S_{xp} & S_{xq} \\ S_{yx} & S_{yy} & S_{yz} & S_{yp} & S_{yq} \\ S_{zx} & S_{zy} & S_{zz} & S_{zp} & S_{zq} \\ S_{px} & S_{py} & S_{pz} & S_{pp} & S_{pq} \\ S_{qx} & S_{qy} & S_{qz} & S_{qp} & S_{qq} \end{pmatrix} \quad (5)$$

In expression (5), the output axes are assumed that their first axis is the X-axis, second axis is the Y-axis, third axis is the Z-axis, fourth axis is the p-axis, and fifth axis is the q-axis. As to the first axis, $s_{xx}$ is the main axis sensitivity because it represents the ratio of the X-axis output to the X-axis input; $s_{xy}$ is transverse sensitivity because it represents the ratio of the X-axis output to the Y-axis input; $s_{xz}$ is transverse sensitivity because it represents the ratio of the X-axis output to the Z-axis input; $s_{xp}$ is transverse sensitivity because it represents the ratio of the X-axis output to the p-axis input; and $s_{xq}$ is transverse sensitivity because it represents the ratio of the X-axis output to the q-axis input. As to the second axis, $s_{yx}$ is transverse sensitivity because it represents the ratio of the Y-axis output to the X-axis input; $s_{yy}$ is the main axis sensitivity because it represents the ratio of the Y-axis output to the Y-axis input; $s_{yz}$ is transverse sensitivity because it represents the ratio of the Y-axis output to the Z-axis input; $s_{yp}$ is transverse sensitivity because it represents the ratio of the Y-axis output to the p-axis input; and $s_{yq}$ is transverse sensitivity because it represents the ratio of the Y-axis output to the q-axis input. As to the third axis, $s_{zx}$ is transverse sensitivity because it represents the ratio of the Z-axis output to the X-axis input; $s_{zy}$ is transverse sensitivity because it represents the ratio of the Z-axis output to the Y-axis input; $s_{zz}$ is the main axis sensitivity because it represents the ratio of the Z-axis output to the Z-axis input; $s_{zp}$ is transverse sensitivity because it represents the ratio of the Z-axis output to the p-axis input; and $s_{zq}$ is transverse sensitivity because it represents the ratio of the Z-axis output to the q-axis input. As to the fourth axis, $s_{px}$ is transverse sensitivity because it represents the ratio of the p-axis output to the X-axis input; $s_{py}$ is transverse sensitivity because it represents the ratio of the p-axis output to the Y-axis input; $s_{pz}$ is transverse sensitivity because it represents the ratio of the p-axis output to the Z-axis input; $s_{pp}$ is the main axis sensitivity because it represents the ratio of the p-axis output to the p-axis input; and $s_{pq}$ is transverse sensitivity because it represents the ratio of the p-axis output to the q-axis input. As to the fifth axis, $s_{qx}$ is transverse sensitivity because it represents the ratio of the q-axis output to the X-axis input; $s_{qy}$ is transverse sensitivity because it represents the ratio of the q-axis output to the Y-axis input; $s_{qz}$ is transverse sensitivity because it represents the ratio of the q-axis output to the Z-axis input; $s_{qp}$ is transverse sensitivity because it represents the ratio of the q-axis output to the p-axis input; and $s_{qq}$ is the main axis sensitivity because it represents the ratio of the q-axis output to the q-axis input.

(In the Case of Six-Axial Acceleration Sensor)

In the case where the acceleration sensor is six-axial, the acceleration sensor has six output axes. If the vector space generated by the vibration generator is assumed to be six-dimensional, the sensitivity matrix is defined by the following matrix.

$$\begin{pmatrix} S_{xx} & S_{xy} & S_{xz} & S_{xp} & S_{xq} & S_{xr} \\ S_{yx} & S_{yy} & S_{yz} & S_{yp} & S_{yq} & S_{yr} \\ S_{zx} & S_{zy} & S_{zz} & S_{zp} & S_{zq} & S_{zr} \\ S_{px} & S_{py} & S_{pz} & S_{pp} & S_{pq} & S_{pr} \\ S_{qx} & S_{qy} & S_{qz} & S_{qp} & S_{qq} & S_{qr} \\ S_{rx} & S_{ry} & S_{rz} & S_{rp} & S_{rq} & S_{rr} \end{pmatrix} \quad (6)$$

In expression (6), the output axes are assumed that their first axis is the X-axis, second axis is the Y-axis, third axis is the Z-axis, fourth axis is the p-axis, fifth axis is the q-axis and sixth axis is the r-axis. As to the first axis, $s_{xx}$ is the main axis sensitivity because it represents the ratio of the X-axis output to the X-axis input; $s_{xy}$ is transverse sensitivity because it represents the ratio of the X-axis output to the Y-axis input; $s_{xz}$ is transverse sensitivity because it represents the ratio of the X-axis output to the Z-axis input; $s_{xp}$ is transverse sensitivity because it represents the ratio of the X-axis output to the p-axis input; $s_{xq}$ is transverse sensitivity because it represents the ratio of the X-axis output to the q-axis input; and $s_{xr}$ is transverse sensitivity because it represents the ratio of the X-axis output to the r-axis input. As to the second axis, $s_{yx}$ is transverse sensitivity because it represents the ratio of the Y-axis output to the X-axis input; $s_{yy}$ is the main axis sensitivity because it represents the ratio of the Y-axis output to the Y-axis input; $s_{yz}$ is transverse sensitivity because it represents the ratio of the Y-axis output to the Z-axis input; $s_{yp}$ is transverse sensitivity because it represents the ratio of the Y-axis output to the p-axis input; $s_{yq}$ is transverse sensitivity because it represents the ratio of the Y-axis output to the q-axis input; and $s_{yr}$ is transverse sensitivity because it represents the ratio of the Y-axis output to the r-axis input. As to the third axis, $s_{zx}$ is transverse sensitivity because it represents the ratio of the Z-axis output to the X-axis input; $s_{zy}$ is transverse sensitivity because it represents the ratio of the Z-axis output to the Y-axis input; $s_{zz}$ is the main axis sensitivity because it represents the ratio of the Z-axis output to the Z-axis input; $s_{zp}$ is transverse sensitivity because it represents the ratio of the Z-axis output to the p-axis input; $s_{zq}$ is transverse sensitivity because it represents the ratio of the Z-axis output to the q-axis input; and $s_{zr}$ is transverse sensitivity because it represents the ratio of the Z-axis output to the r-axis input. As to the fourth axis, $s_{px}$ is transverse sensitivity because it represents the ratio of the p-axis output to the X-axis input; $s_{py}$ is transverse sensitivity because it represents the ratio of the p-axis output to the Y-axis input; $s_{pz}$ is transverse sensitivity because it represents the ratio of the p-axis output to the Z-axis input; $s_{pp}$ is the main axis sensitivity because it represents the ratio of the p-axis output to the p-axis input; $s_{pq}$ is transverse sensitivity because it represents the ratio of the p-axis output to the q-axis input; and $s_{pr}$ is transverse sensitivity because it represents the ratio of the p-axis output to the r-axis input. As to the fifth axis, $s_{qx}$ is transverse sensitivity because it represents the ratio of the q-axis output to the X-axis input; $s_{qy}$ is transverse sensitivity because it represents the ratio of the q-axis output to the Y-axis input; $s_{qz}$ is transverse sensitivity because it represents the ratio of the q-axis output to the Z-axis input; $s_{qp}$ is transverse sensitivity because it represents the ratio of the q-axis output to the p-axis input; $s_{qq}$ is the main axis sensitivity because it represents the ratio of the q-axis output to the q-axis input; and $s_{qr}$ is transverse sensitivity because it represents the ratio of the q-axis output to the r-axis input. As to the sixth axis, $s_{rx}$ is transverse sensitivity because it represents the ratio of the r-axis output to the X-axis input; $s_{ry}$ is transverse sensitivity because it represents the ratio of the r-axis output to the Y-axis input; $s_{rz}$ is transverse sensitivity because it represents the ratio of the r-axis output to the Z-axis input; $s_{rp}$ is transverse sensitivity because it represents the ratio of the r-axis output to the p-axis input; $s_{rq}$ is transverse sensitivity because it represents the ratio of the r-axis output to the q-axis input; and $s_{rr}$ is the main axis sensitivity because it represents the ratio of the r-axis output to the r-axis input.

For each axis, the diagonal components can be obtained using the translational acceleration or angular acceleration input in each axis direction of x, y, z, p, q and r and the output signal from the corresponding output terminal. Thus they are not described here. In addition, it should be noted that the following factors are not determined in advance in the number of axes: how many degrees of freedom are in the detection of the translational acceleration, and how many pieces of detection of the rotational angular acceleration take place. It is important that a four-axial acceleration sensor can have three degrees of freedom in the detection of the rotational angular acceleration, and one degree of freedom in the detection of the translational angular acceleration. As long as there is even one degree of freedom in detecting the translational acceleration, there are transverse sensitivity characteristics, and the transverse sensitivity indicating them. According to the present invention, the transverse sensitivity can be obtained without using an expensive apparatus.

Advantages of the Invention

Advantages of the present invention are as follows:

(1) The matrix sensitivity of a sensor for detecting acceleration can be measured using a uniaxial vibration generator with a simple structure and a jig.

(2) Generally, the accuracy of the acceleration measurement can be improved. The reason for this will be described below.

Assume that a triaxial accelerometer is used for measuring the translational acceleration motion in a three-dimensional space. In this case, the matrix sensitivity is defined by the following expression.

$$\begin{pmatrix} V_{ox}(t) \\ V_{oy}(t) \\ V_{oz}(t) \end{pmatrix} = \begin{pmatrix} S_{xx} & S_{xy} & S_{xz} \\ S_{yx} & S_{yy} & S_{yz} \\ S_{zx} & S_{zy} & S_{zz} \end{pmatrix} \begin{pmatrix} a_{ix}(t) \\ a_{iy}(t) \\ a_{iz}(t) \end{pmatrix} \quad (7)$$

For the sake of simplicity, assume that the diagonal components of the sensitivity matrix are all one, and the transverse sensitivity is e %.

Neglecting the transverse sensitivity, assume that the X component, Y component and Z component of the acceleration input in the (1, 1, 1) direction are given by t. Then, the absolute value of the acceleration as the output signal becomes $\sqrt{3} \cdot \tau$. In terms of the matrix sensitivity considering the transverse sensitivity e, the absolute value of the acceleration as the output signal becomes $\sqrt{3}/(1+2\epsilon) \cdot \tau$. Considering this in reverse, the signal to be measured as the input signal of $\sqrt{3}\tau/(1+2)$ correctly is recognized as $\sqrt{3}\tau$. The error in this case becomes 2e % according to the following expression (8).

$$\frac{\sqrt{3}\,\tau - \frac{\sqrt{3}\,\tau}{1+2\varepsilon}}{\frac{\sqrt{3}\,\tau}{1+2\varepsilon}} = 2\varepsilon \quad (8)$$

Piezoelectric acceleration sensors are said to have transverse sensitivity of 2-3% normally, and 3% transverse sensitivity results in 6% measurement error.

At present, development of the semiconductor acceleration sensors or gyroscopes according to silicon micromachining has been widely spread around the whole world. However, no papers have been reported up to now which include measurement results of the transverse sensitivity obtained by persuasive method.

(3) Improving the accuracy of the acceleration measurement can advance the industrial technology of our country to a higher-level, higher-value-added one.

(4) Using a uniaxial vibration generator can offer nearly the same matrix sensitivity of the acceleration sensor as using a multi-axis, multi-dimensional vibration generator for calibration, thereby being able to measure the acceleration as a vector.

(5) Taking account of the transverse sensitivity enables obtaining more accurate acceleration. Accordingly, marginal design becomes possible in the development of industrial products manufactured in accordance with a variety of compulsory standards. Among the compulsory standards, there are occupant safety standards (mandatory statutes of foreign countries including Japan, which correspond to the U.S. standards FMVSS 201), and human body vibration standards ISO8041, 2631-1, 2631-2, 2631-3, 2631-4, 2631-5 and the like.

(6) High accuracy control of industrial robots becomes possible.

(7) Enhancement of the performance of a testing machine for generating the motion (such as a vibration generator) is carried out.

(8) Delicate and sophisticated control by humanoid robots become possible.

(9) Measurement of earthquakes with seismometers becomes high accuracy.

(10) It leads to the development of human body exposure vibration monitoring apparatuses based on the vibration exposure regulatory standard of a human body.

(11) It can improve the accuracy of the vibration measurement and acceleration measurement of structures and the like.

(12) It leads to public awareness of the insignificance of the international key comparison carried out by the International Bureau of Weights and Measures, and to the execution of the international comparison for the transverse sensitivity measurement.

(13) The semiconductor acceleration sensors make dramatic progress in performance because of the generalization of the expression based on the matrix sensitivity considering the transverse sensitivity in the semiconductor acceleration sensors.

(14) It can implement an earth crust continuously monitoring system, which enables the tectonics to be recognized in the form of images.

BEST MODE FOR CARRYING OUT THE INVENTION

Figure 1A:
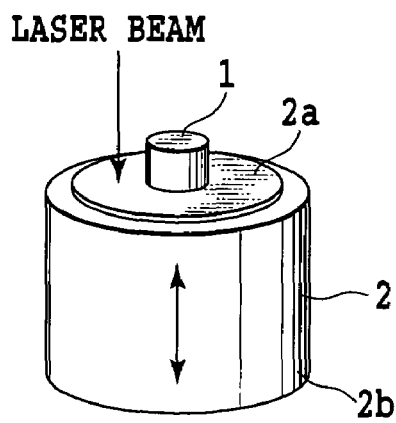
FIG. 1A is a diagram illustrating a calibration method of an accelerometer/acceleration sensor.
Figure 1C:
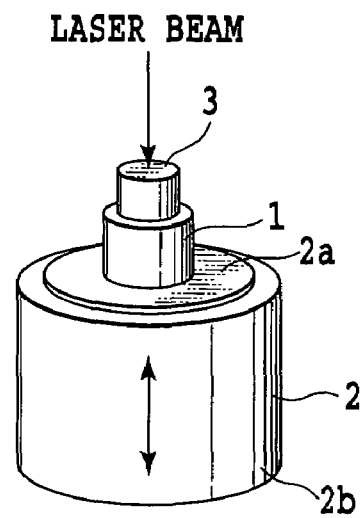
FIG. 1C is a diagram illustrating a calibration method of an accelerometer/acceleration sensor.
Figure 1B:
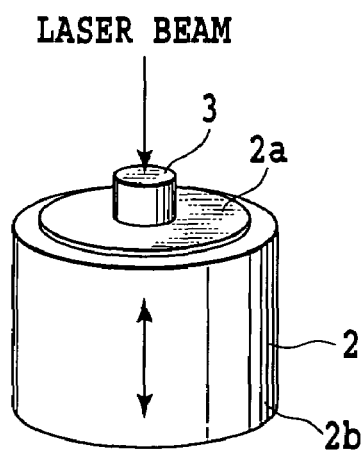
FIG. 1B is a diagram illustrating a calibration method of an accelerometer/acceleration sensor.
Figure 1D:
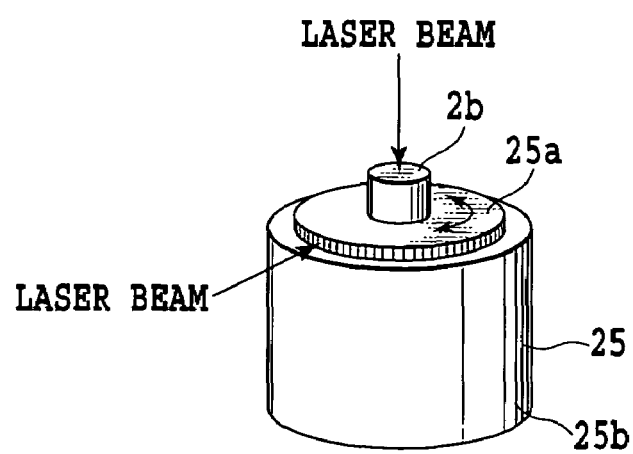
FIG. 1D is a diagram illustrating a calibration method of an accelerometer/acceleration sensor.
Figure 2:
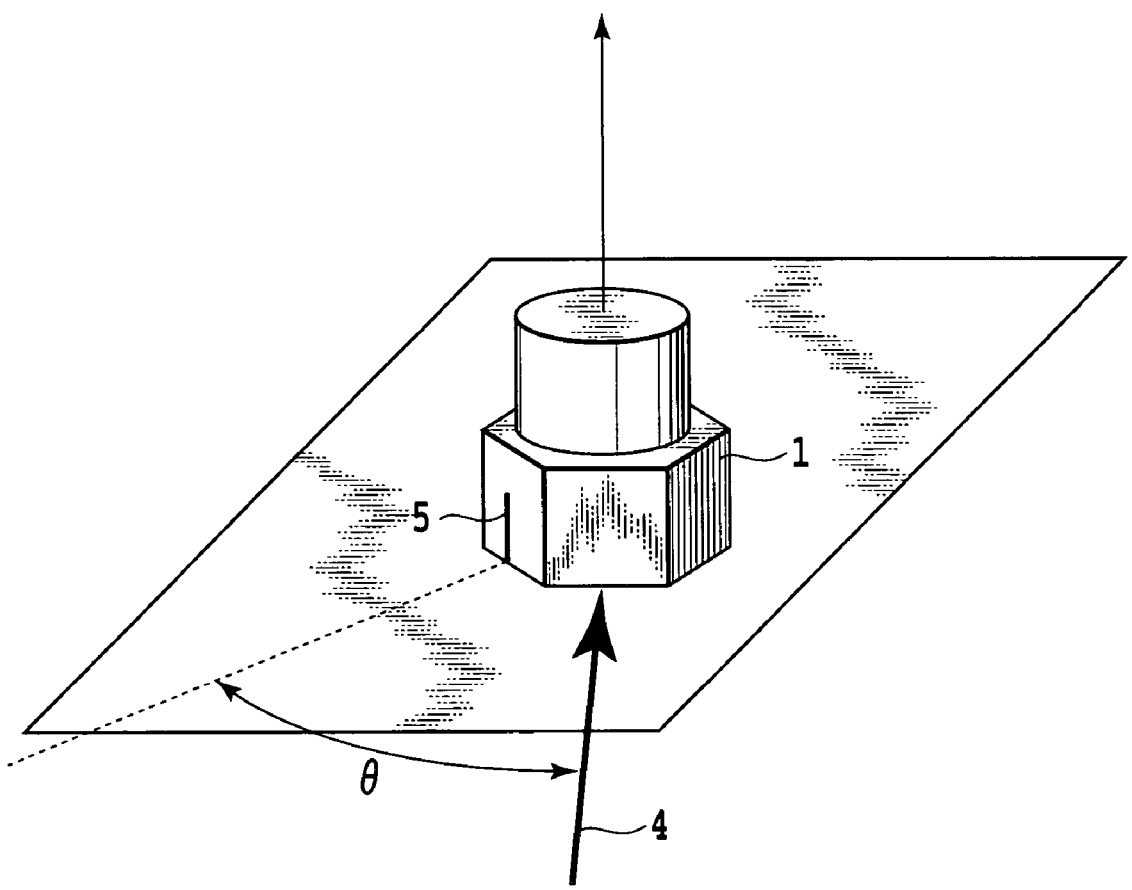
FIG. 2 is a diagram illustrating a method described in ISO 5347 Part 11.
Figure 3:
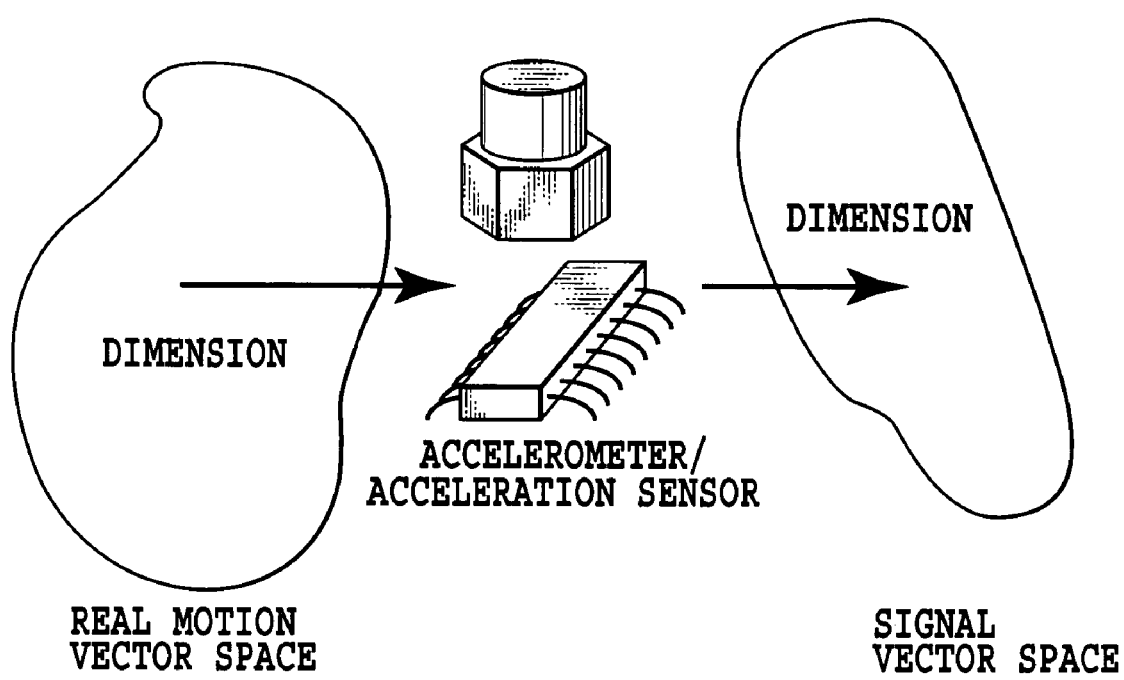
FIG. 3 is a diagram illustrating a mathematical definition of the function of an acceleration sensor.
Figure 4A:
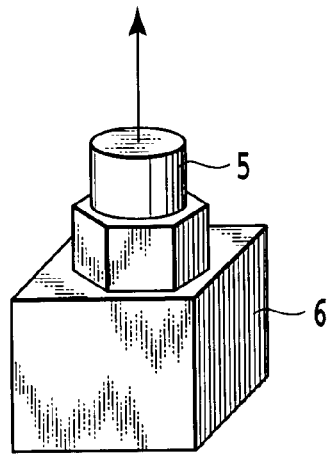
FIG. 4A is a diagram illustrating an example of an acceleration sensor and an acceleration vector.
Figure 4B:
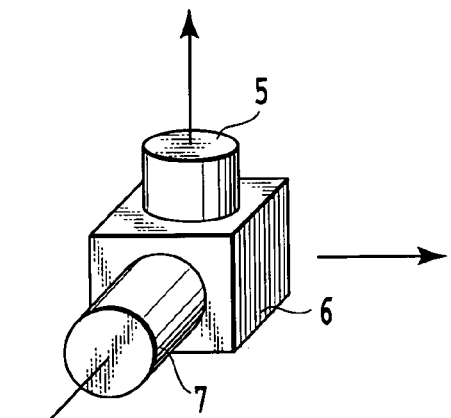
FIG. 4B is a diagram illustrating an example of an acceleration sensor and an acceleration vector.
Figure 4C:
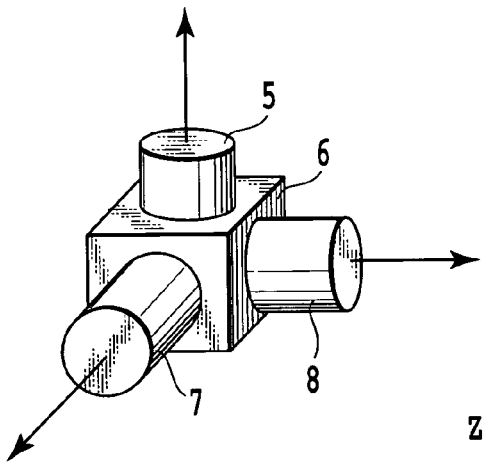
FIG. 4C is a diagram illustrating an example of an acceleration sensor and an acceleration vector.
Figure 4D:
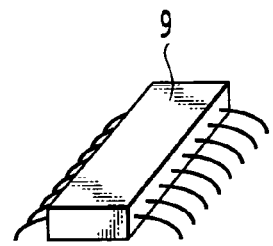
FIG. 4D is a diagram illustrating an example of an acceleration sensor and an acceleration vector.

The following embodiments employ acceleration sensors as shown in FIG. 4A-FIG. 4D:

FIG. 4A shows a single uniaxial acceleration sensor 5 mounted on a surface of a cubical block 6 serving as a jig;

FIG. 4B shows two uniaxial acceleration sensors 5 mounted on two surfaces of the cubical block 6 serving as a jig, respectively;

FIG. 4C shows three uniaxial acceleration sensors 5 mounted on three surfaces of the cubical block 6 serving as a jig, respectively; and FIG. 4D shows a semiconductor accelerometer (which includes one having gyroscopic functions or angular acceleration measuring functions), which is to be mounted on a surface of a cubical block serving as a jig.

Figure 5:
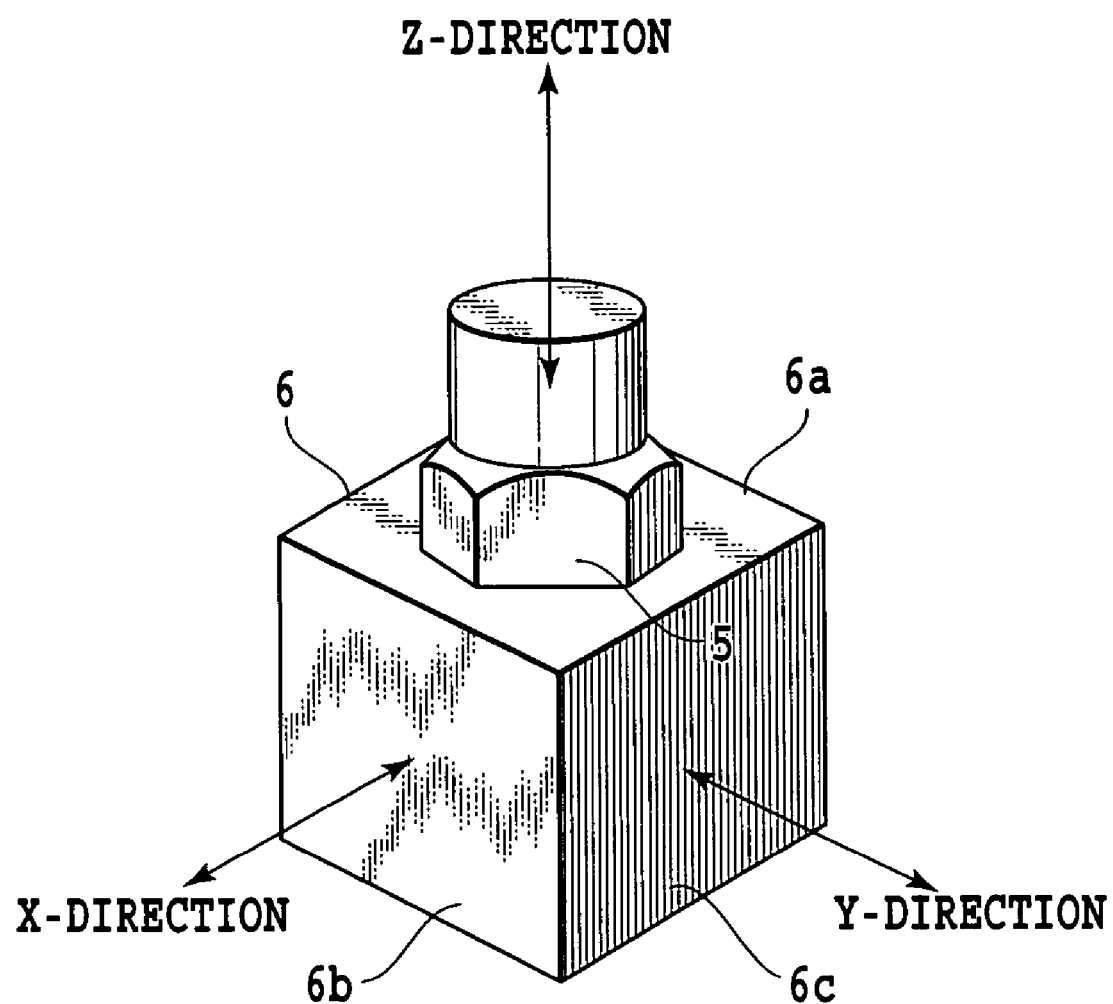
FIG. 5 is a diagram illustrating a manner of mounting a uniaxial acceleration sensor on a cubical block.
Figure 6:
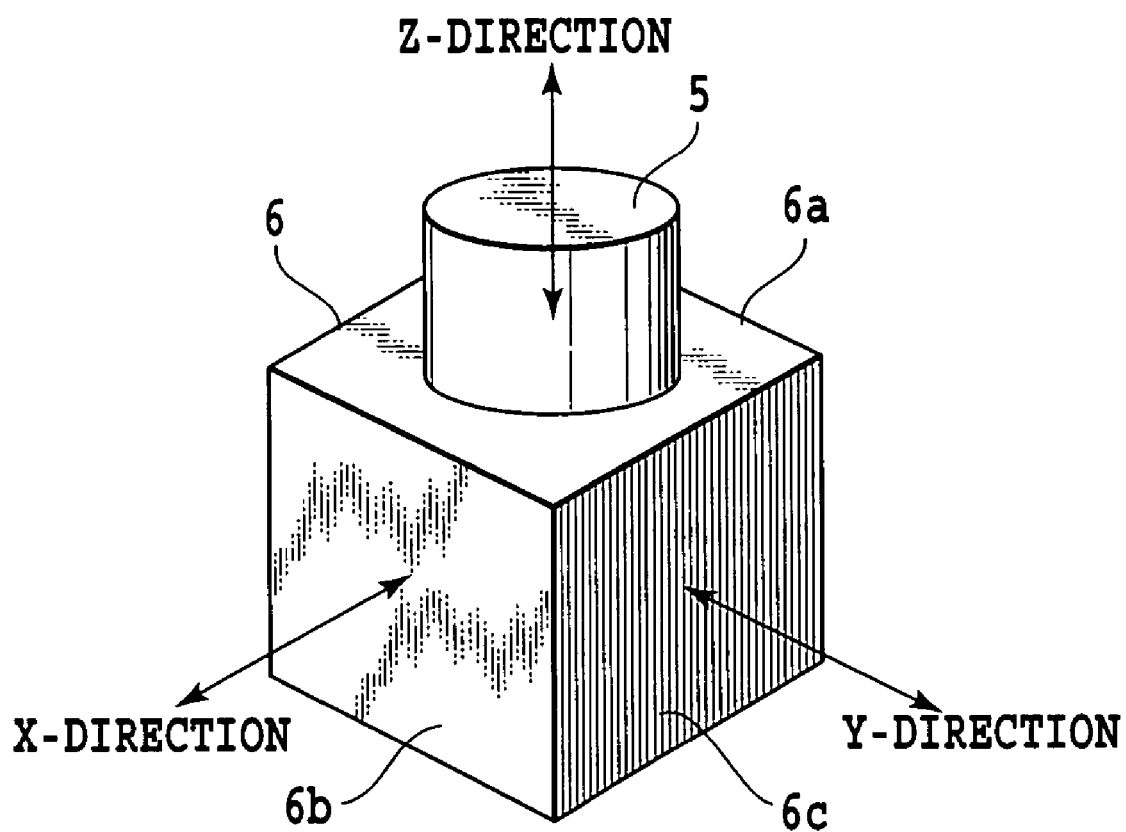
FIG. 6 is a diagram illustrating a manner of mounting the uniaxial acceleration sensor on the cubical block in a simpler fashion.

The definition of each surface of the cubical block, to which each sensor is mounted, is as shown in FIG. 5 or FIG. 6 (designated by reference symbols), and is common to all the sensors.

Figure 4E:
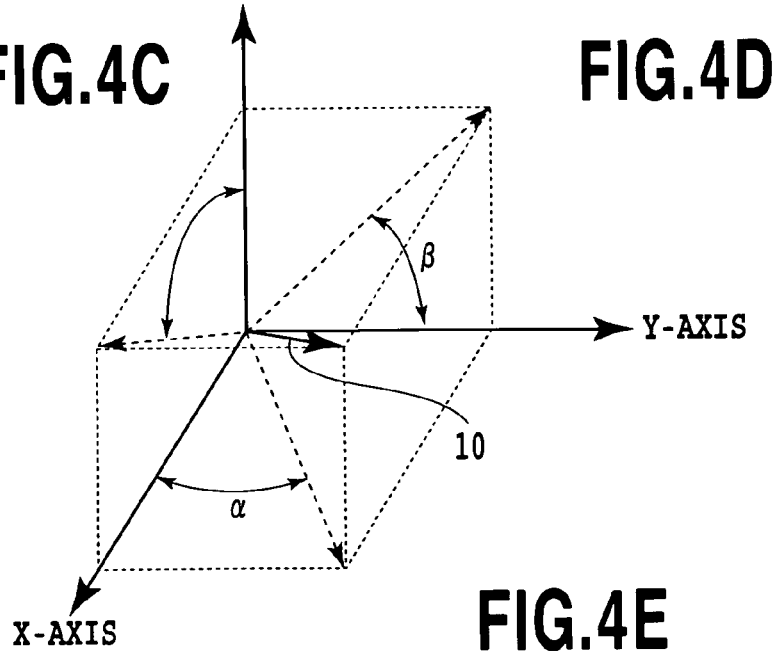
FIG. 4E is a diagram illustrating an example of an acceleration sensor and an acceleration vector.

FIG. 4E shows coordinate axes (X-axis, Y-axis and Z-axis perpendicular to each other) of the coordinate system in a space defining the input acceleration to the acceleration sensors of FIG. 4A-FIG. 4D, and the resolution of acceleration 10 into coordinate axis directions.

In the Case of Single Uniaxial Acceleration Sensor (FIG. 4A)

A common piezoelectric acceleration sensor used as the uniaxial acceleration sensor 5 has a shape as shown in FIG. 5. It has its screw at the bottom screwed into and fixed to a surface of the cubical block 6 serving as a jig so that the uniaxial acceleration sensor 5 is mounted on the cubical block 6. The cubical block 6 used must have sufficient geometric accuracy and surface accuracy. In this state, the direction of the main sensing axis of the acceleration sensor 5 is perpendicular to the mounting surface 6a of the cubical block 6 on which the acceleration sensor 5 is mounted.

Here, the relationships between the output axis (main sensing axis) of the uniaxial acceleration sensor 5 and two axes orthogonal to the output axis and the coordinate axes of the coordinate system (X, Y, Z axes) of the space defining the input acceleration are defined as follows. Specifically, the direction of the main sensing axis, which is the output axis of the uniaxial acceleration sensor 5, is defined as the Z-axis. Accordingly, one of the two axes orthogonal to the output axis (Z-axis) can be defined as the X-axis which is orthogonal to the Z-axis and agrees with an axis orthogonal to a surface 6b orthogonal to the mounting surface 6a of the cubical block 6. The other of the two axes can be defined as the Y-axis which is orthogonal to the Z-axis and to another surface 6c orthogonal to both the mounting surface 6a and surface 6b of the cubical block 6. Such definition makes it enough for the uniaxial acceleration sensor 5 to be mounted on the cubical block 6 without obtaining the maximum value and minimum value of the transverse sensitivity data and the angles $\theta_{man}$ and $\theta_{min}$ corresponding to them in the uniaxial acceleration sensor 5 as in the foregoing ISO 5347 Part 11, that is, independently of the locations at which the maximum value and minimum value of the transverse sensitivity data are obtained (this also applies to the following examples).

Thus, as will be described later, mounting the opposite side of the mounting surface 6a of the cubical block 6 on the surface of a table 12 of a vibration generator 11 (FIG. 7) aligns the main sensing axis (Z-axis) of the uniaxial acceleration sensor 5 with the vibration direction of the table 12 of the vibration generator. In other words, the cubical block 6 and the uniaxial acceleration sensor 5 mounted thereon are shaken in the direction of the Z-axis among the coordinate axes of the coordinate system of the space defining the input acceleration. In addition, mounting another surface 6b of the cubical block 6 on the surface of the table 12 of the vibration generator 11 aligns the X-axis of the uniaxial acceleration sensor 5 with the vibration direction of the table 12 of the vibration generator so that the cubical block 6 and the uniaxial acceleration sensor 5 mounted thereon are shaken in the direction of the X-axis among the coordinate axes of the coordinate system of the space defining the input acceleration. Likewise, mounting another surface 6c of the cubical block 6 on the surface of the table 12 of the vibration generator 11 aligns the Y-axis of the uniaxial acceleration sensor 5 with the vibration direction of the table 12 of the vibration generator so that the cubical block 6 and the uniaxial acceleration sensor 5 mounted thereon are shaken in the direction of the Y-axis among the coordinate axes of the coordinate system of the space defining the input acceleration.

In the following description (and drawings), the uniaxial acceleration sensor 5 is often drawn in the shape of a cylinder as shown in FIG. 6 for the sake of simplicity. In FIG. 6, the two-directional arrow ↔ indicates the direction of the main sensing axis of the acceleration sensor 5.

a. Measurement of Main Axis Sensitivity

Figure 7:
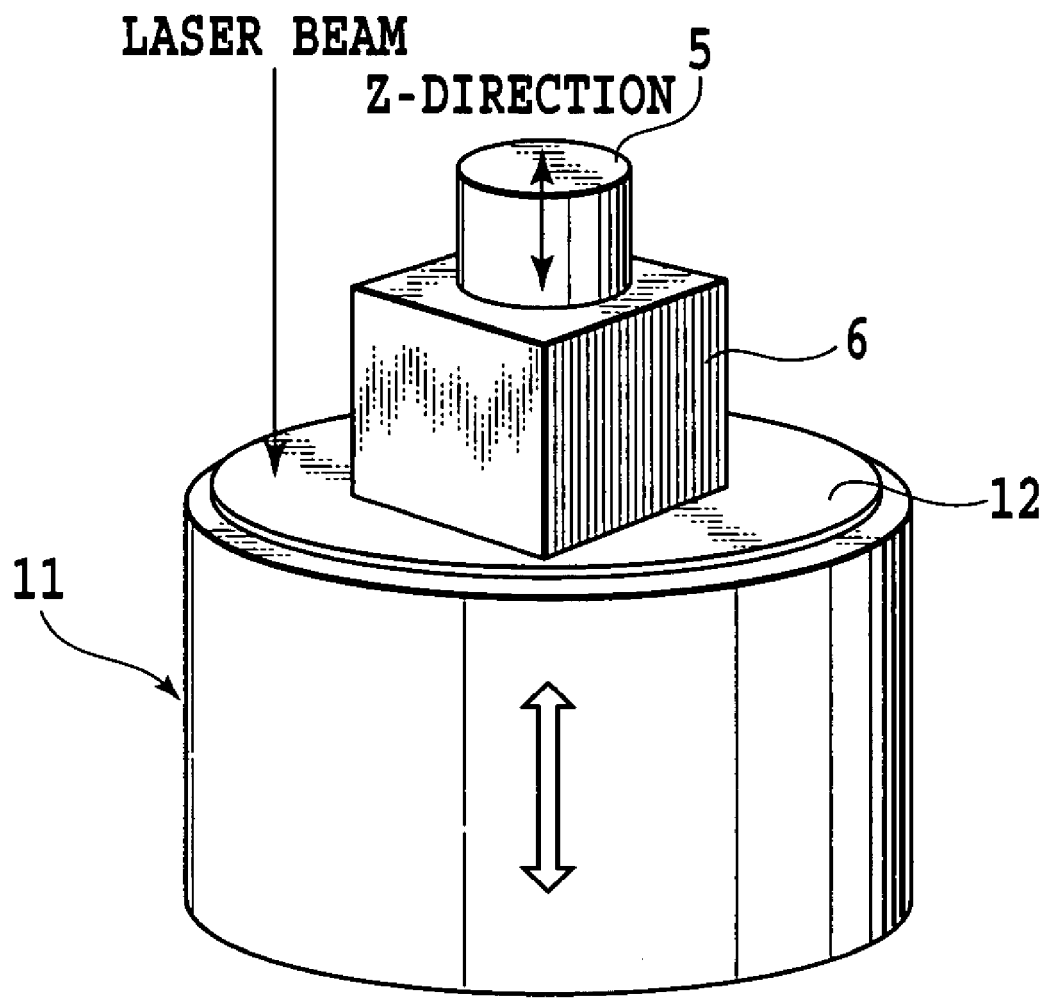
FIG. 7 is a diagram illustrating a manner of mounting the uniaxial acceleration sensor to a uniaxial vibration generator for measuring the main axis sensitivity of the uniaxial acceleration sensor.

FIG. 7 shows a manner of mounting the uniaxial acceleration sensor 5 on the uniaxial vibration generator 11 to measure the main axis sensitivity of the uniaxial acceleration sensor 5. The cubical block 6, on which the uniaxial acceleration sensor 5 is mounted, is fixed on the table 12 on top of the uniaxial vibration generator 11. The table 12 is flat, and as shown in FIG. 7, the table 12, being installed horizontally, vibrates in the vertical direction (as indicated by the arrow □ in FIG. 7). As for the manner of mounting in FIG. 7, the opposite side (back) of the mounting surface 6a of the cubical block 6, on which the uniaxial acceleration sensor 5 is mounted, is fixed to the table 12. Thus, in this state, the direction of the Z-axis of the coordinate axes of the coordinate system of the space defining the input acceleration agrees with the vibration direction of the table 12 of the vibration generator, and the table 12 of the vibration generator is vibrated in this state. The motion acceleration of the surface of the table 12 becomes the input acceleration to the uniaxial acceleration sensor 5. The motion of the surface of the table 12 is measured with a laser interferometer or with a measuring instrument such as an acceleration sensor with higher accuracy independently. As for the measurement of the input acceleration to the uniaxial acceleration sensor 5, it can be obtained not only by measuring the motion of the table surface independently but also by a method that will be described later.

The output signal indicating the measured results from the uniaxial acceleration sensor 5 and the signal indicating the measured results of the measuring instruments for measuring the motion of the surface of the table 12 independently are supplied to an arithmetic unit (such as a computer). The arithmetic unit obtains the transverse sensitivity matrix by carrying out calculations which will be described below (this also applies to all the following examples).

Figure 8:
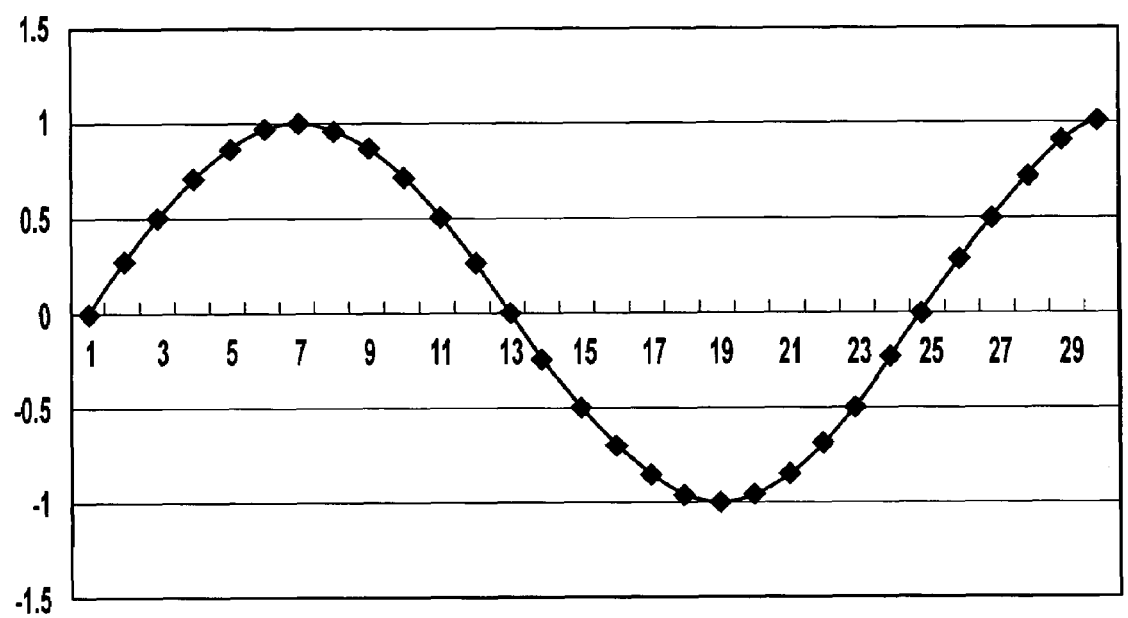
FIG. 8 is a graph illustrating an example of the input acceleration signal to the uniaxial acceleration sensor.
Figure 9:
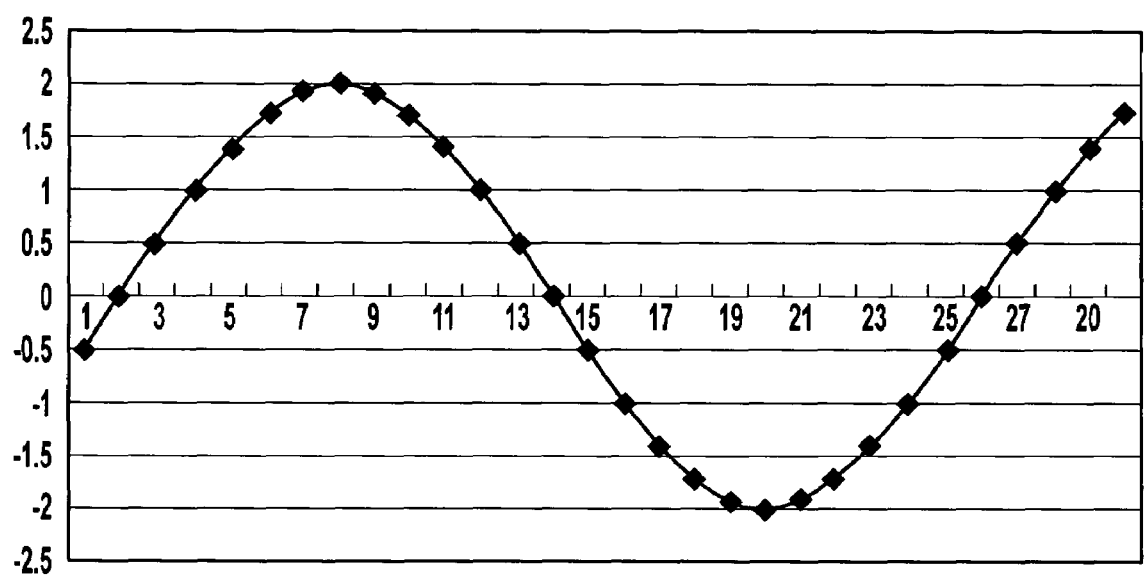
FIG. 9 is a graph illustrating an example of the output signal from an uniaxial acceleration sensor 5.

First, FIG. 8 and FIG. 9 are graphs illustrating the relationships between the input acceleration signal to the uniaxial acceleration sensor 5 (that is, the measurement signal from a laser interferometer measuring the surface of the table 12 directly, or from the measuring instrument such as the acceleration sensor with higher accuracy) and the output signal from the uniaxial acceleration sensor 5, for example.

The ordinate of FIG. 8 shows the acceleration input to the uniaxial acceleration sensor 5 in units of meters/(seconds seconds). On the other hand, the ordinate of FIG. 9 shows the output from the uniaxial acceleration sensor 5 in units of voltages. The abscissas of FIG. 8 and FIG. 9 show time, and the start timings of the two agree with each other.

Representing the input acceleration by $a_{iz} \exp(j\omega t)$ and the output signal of the uniaxial acceleration sensor 5 by $a_{oz} \exp(j\omega t)$, the main axis sensitivity $S_{zz}(\omega)$ of the uniaxial acceleration sensor 5 is defined by the following expression.

$$S_{zz}(\omega) = \frac{a_{oz}\exp(j\omega t)}{a_{iz}\exp(j\omega t)} \quad (9)$$

where the meaning of the subscripts of S is the same as that of the definition of the sensitivity matrix described above: the first subscript (z here) represents the axis that agrees with one of the coordinate axes of the coordinate system of the space defining the input acceleration, and that indicates the direction of the output axis of the uniaxial acceleration sensor 5 (Z-axis, here); and the second subscript (z here) represents the axis that agrees with the vibration (shaking) direction of the table of the vibration generator among the axes of the uniaxial acceleration sensor mounted on the table of the uniaxial vibration generator (as for the subscripts of S, this also applies to the following description). Since a phase lag and sensitivity reduction enter the term $a_{oz}$, the sensitivity becomes a complex number.

b. Measurement of Transverse Sensitivity

Figure 10:
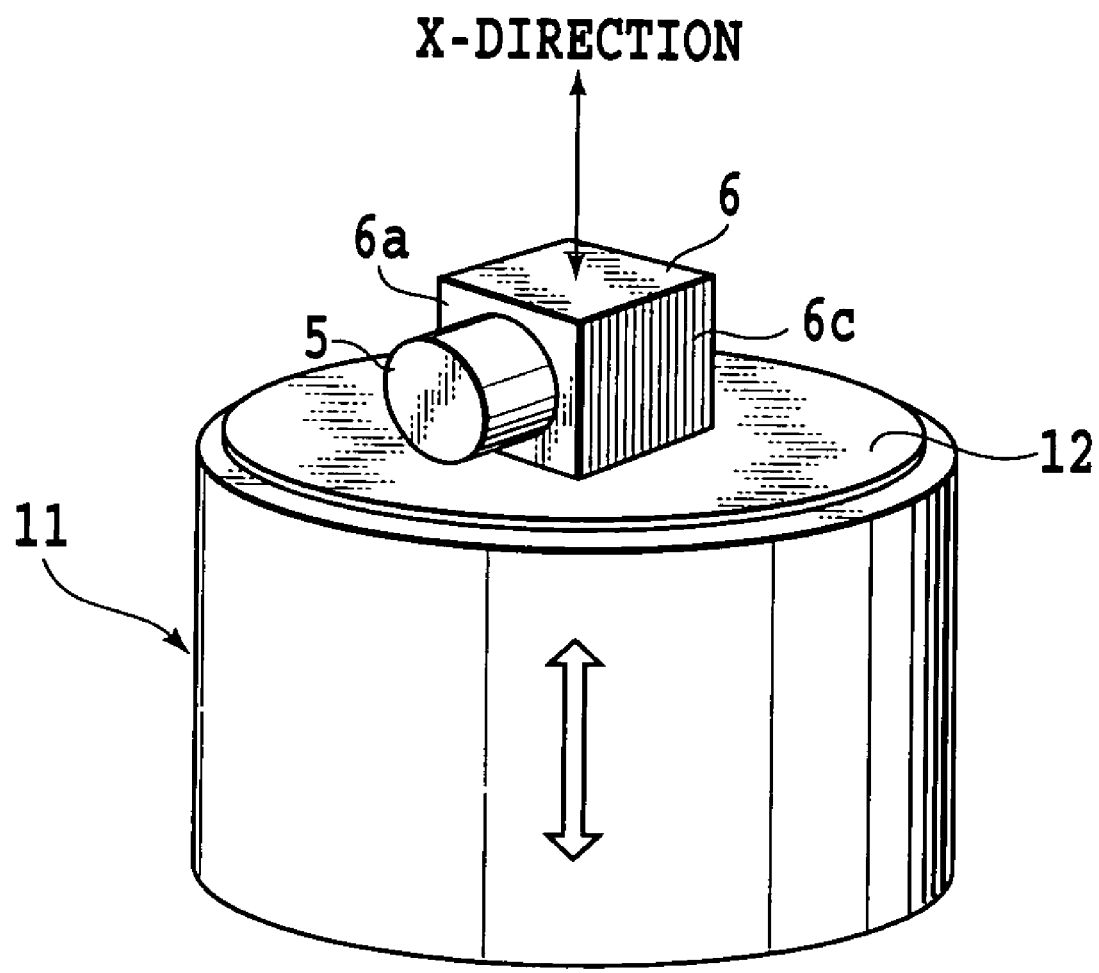
FIG. 10 is a diagram illustrating another manner of mounting the uniaxial acceleration sensor to the cubical block in a simpler fashion.

As shown in FIG. 10, on the table 12 of the vibration generator 11 is fixed the surface 6b of the cubical block 6, on which the uniaxial acceleration sensor 5 is mounted, in such a manner that the direction of the X-axis defined with respect to the uniaxial acceleration sensor 5 is aligned with the vibration direction of the table 12 of the vibration generator. In this state, the table 12 of the vibration generator is vibrated. As in the measurement of the main axis sensitivity, the transverse sensitivity $S_{zx}$ is obtained from the measured results of the uniaxial acceleration sensor 5 and the measured results of the measuring instrument that measures the motion of the surface of the table 12 independently.

Assume that the input acceleration is represented by $a_{ix} \exp(j\omega t)$, and the output signal of the acceleration sensor by $a_{oz} \exp(j\omega t)$. Then the sensitivity $S_{zx}(\omega)$ of the acceleration sensor in the matrix sensitivity is given by the following expression.

$$S_{zx}(\omega) = \frac{a_{oz}\exp(j\omega t)}{a_{ix}\exp(j\omega t)} \quad (10)$$

It goes without saying that the phase shift and gain reduction are absorbed into the complex number $a_{oz}$, and the transverse sensitivity becomes a complex number given as a function of an angular frequency.

Figure 11:
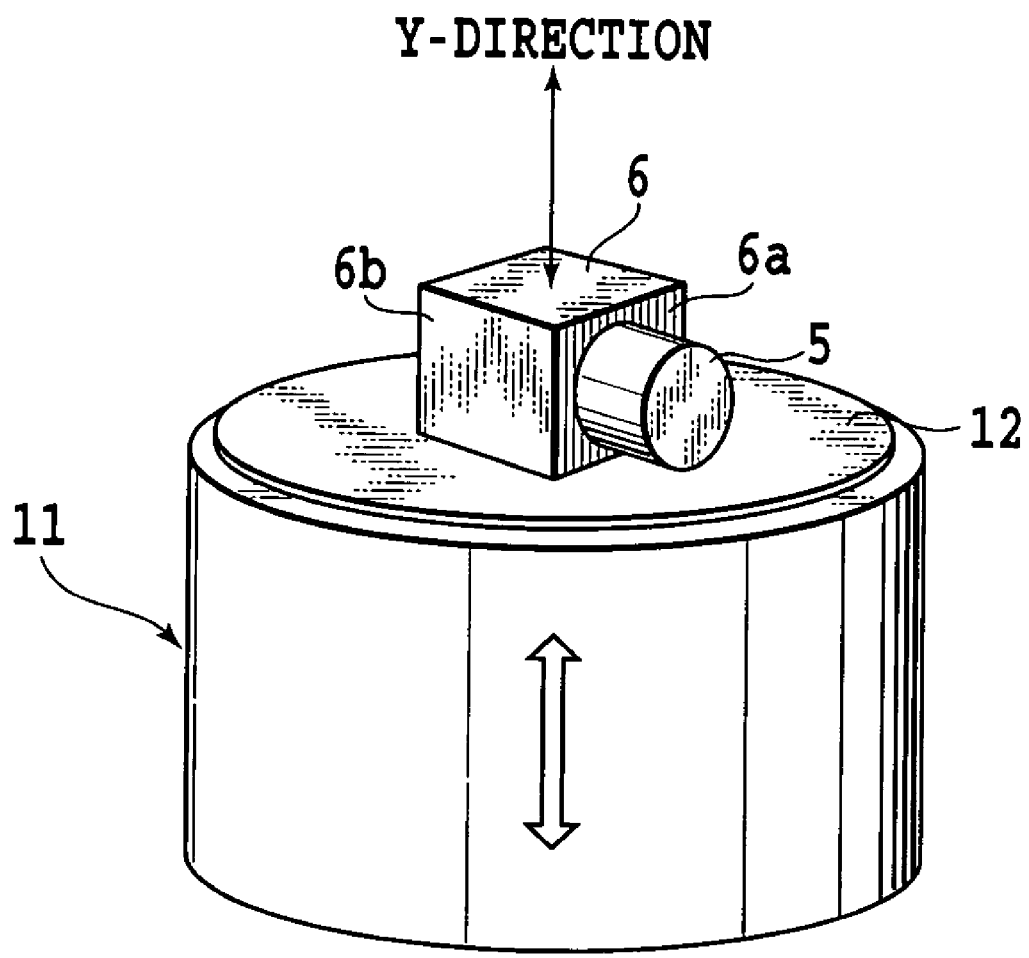
FIG. 11 is a diagram illustrating still another manner of mounting the uniaxial acceleration sensor to the cubical block in a simpler fashion.

Likewise, as shown in FIG. 11, on the table 12 of the vibration generator 11 is fixed the surface 6c of the cubical block 6, on which the uniaxial acceleration sensor 5 is mounted, in such a manner that the direction of the Y-axis defined with respect to the uniaxial acceleration sensor 5 is aligned with the vibration direction of the table 12 of the vibration generator. In this state, the table 12 of the vibration generator is vibrated. As in the measurement of the main axis sensitivity, the transverse sensitivity $S_{zy}$ is obtained from the measured results of the uniaxial acceleration sensor 5 and the measured results of the measuring instrument that measures the motion of the surface of the table 12 independently.

Assume that the input acceleration is represented by $a_{iy} \exp(j\omega t)$, and the output signal of the acceleration sensor 5 by $a_{oz} \exp(j\omega t)$. Then the sensitivity $S_{zy}(\omega)$ of the acceleration sensor in the matrix sensitivity is given by the following expression.

$$S_{zy}(\omega) = \frac{a_{oz}\exp(j\omega t)}{a_{iy}\exp(j\omega t)} \quad (11)$$

It goes without saying that the phase shift and gain reduction are absorbed into the complex number $a_{oz}$, and the transverse sensitivity becomes a complex number given as a function of an angular frequency.

From the above, establishing the input and output relationships of the uniaxial acceleration sensor 5 with reference to expression (1) gives the following expression (12) (the left side is the output and the right side is the input).

$$V_{oz}\exp(j\omega t) = \begin{pmatrix} S_{zx} & S_{zy} & S_{zz} \end{pmatrix} \begin{pmatrix} a_{ix}\exp(j\omega t) \\ a_{iy}\exp(j\omega t) \\ a_{iz}\exp(j\omega t) \end{pmatrix} \quad (12)$$

Although the foregoing description is made by way of example in which the single sensor is mounted on the cubical block 6, this is only for convenience of description: the number of the sensors mounted on the single surface of the cubical block is not limited to one. Thus, a plurality of sensors can be mounted on the same surface of the cubical block with a size capable of being fixed to the table surface of the vibration generator to carry out measurement by the plurality of sensors simultaneously or independently. Alternatively, a plurality of cubical blocks can be mounted on the table surface of the vibration generator to mount a single sensor on each cubical block or a plurality of sensors on a surface of each cubical block, thereby carrying out the measurement for each sensor or for all the sensors simultaneously. This also applies to the following examples.

In the Case of Two Uniaxial Acceleration Sensors (FIG. 4B)

Two uniaxial acceleration sensors 5 and 7 are mounted on the mounting surfaces 6a and 6b of the cubical block 6, respectively. In this state, the direction of the main sensing axis of the acceleration sensor 5 is orthogonal to the mounting surface 6a of the cubical block 6 to which the acceleration sensor 5 is fixed, and the direction of the main sensing axis of the acceleration sensor 7 is orthogonal to the mounting surface 6b of the cubical block 6 to which the acceleration sensor 7 is fixed. As for the uniaxial acceleration sensor 5, its conditions are the same as those of FIG. 4A. As for the uniaxial acceleration sensor 7, its output axis, the main sensing axis direction, is defined as the X-axis. On the other hand, as for its two axes orthogonal to the X-axis, Y-axis and Z-axis, the Y-axis is defined as an axis that is orthogonal to the X-axis and to the mounting surface 6c of the cubical block 6, and the Z-axis is defined as an axis that is orthogonal to the X-axis and to the mounting surface 6a of the cubical block 6.

Accordingly, relationships between the X-, Y- and Z-axes of the uniaxial acceleration sensor 5 and the vibration direction of the table 12 of the vibration generator are the same as described above. Thus, the main axis sensitivity $S_{zz}(\omega)$ and transverse sensitivity $S_{zx}(\omega)$ and $S_{zy}(\omega)$ of the uniaxial acceleration sensor can be obtained in the same manner as described above.

In addition, the main axis sensitivity $S_{xx}(\omega)$ of the uniaxial acceleration sensor 7 can be obtained by mounting the opposite side to the mounting surface 6b of the cubical block 6 on the surface of the table 12 of the vibration generator 11, and by shaking the cubical block 6 by vibrating the table 12 of the vibration generator in the state in which the main sensing axis (X-axis) of the uniaxial acceleration sensor 7 is aligned with the vibration direction of the table 12 of the vibration generator, that is, by shaking the cubic block 6 in the X-axis direction among the coordinate axes of the coordinate system of the space defining the input acceleration.

Assume that the input acceleration is represented by $a_{ix}\exp(j\omega t)$, and the output signal of the uniaxial acceleration sensor 7 is represented by $a_{ox}\exp(j\omega t)$, then the main axis sensitivity $S_{xx}(\omega)$ of the uniaxial acceleration sensor 7 is defined by the following expression.

$$S_{xx}(\omega) = \frac{a_{ox}\exp(j\omega t)}{a_{ix}\exp(j\omega t)} \quad (13)$$

Likewise, the transverse sensitivity $S_{xy}(\Omega)$ of the uniaxial acceleration sensor 7 can be obtained by mounting the mounting surface 6c of the cubical block 6 on the surface of the table 12 of the vibration generator 11, and by shaking the cubical block 6 by vibrating the table 12 of the vibration generator in the state in which the Y-axis of the uniaxial acceleration sensor 7 is aligned with the vibration direction of the table 12 of the vibration generator, that is, by shaking the cubic block 6 in the Y-axis direction among the coordinate axes of the coordinate system of the space defining the input acceleration.

Assume that the input acceleration is represented by $a_{iy}\exp(j\omega t)$, and the output signal of the acceleration sensor 7 is represented by $a_{ox}\exp(j\omega t)$, then the sensitivity $S_{xy}(\omega)$ of the acceleration sensor 7 in the matrix sensitivity is defined by the following expression.

$$S_{xy}(\omega) = \frac{a_{ox}\exp(j\omega t)}{a_{iy}\exp(j\omega t)} \quad (14)$$

In addition, the transverse sensitivity $S_{xz}(\omega)$ of the uniaxial acceleration sensor 7 can be obtained by mounting the opposite side to the mounting surface 6a of the cubical block 6 on the surface of the table 12 of the vibration generator 11, and by shaking the cubical block 6 by vibrating the table 12 of the vibration generator in the state in which the Z-axis of the uniaxial acceleration sensor 7 is aligned with the vibration direction of the table 12 of the vibration generator, that is, by shaking the cubic block 6 in the Z-axis direction among the coordinate axes of the coordinate system of the space defining the input acceleration.

Assume that the input acceleration is represented by $a_{iz}\exp(j\omega t)$, and the output signal of the acceleration sensor 7 is represented by $a_{ox}\exp(j\omega t)$, then the sensitivity $S_{xz}(\omega)$ of the acceleration sensor 7 in the matrix sensitivity is defined by the following expression.

$$S_{xz}(\omega) = \frac{a_{ox}\exp(j\omega t)}{a_{iz}\exp(j\omega t)} \quad (15)$$

From the above, establishing the input and output relationships between the two uniaxial acceleration sensors gives the following expression (16) (the left side is the output, and the right side is the input).

$$\begin{pmatrix} V_{ox}\exp(j\omega t) \\ V_{oz}\exp(j\omega t) \end{pmatrix} = \begin{pmatrix} S_{xx} & S_{xy} & S_{xz} \\ S_{zx} & S_{zy} & S_{zz} \end{pmatrix} \begin{pmatrix} a_{ix}\exp(j\omega t) \\ a_{iy}\exp(j\omega t) \\ a_{iz}\exp(j\omega t) \end{pmatrix} \quad (16)$$

In summary, assuming that the matrix sensitivity is defined by the foregoing expression (16), the elements of the matrix can be obtained by the following procedures.

| Elements | Obtaining Procedure |
|---|---|
| $S_{xx}$ | Shaking the whole block, on which the accelerometer 5 and accelerometer 7 are mounted, in the X-axis direction only, and obtaining by comparing the shaking acceleration with the output signal of accelerometer 7. |
| $S_{xy}$ | Shaking the whole block, on which the accelerometer 5 and accelerometer 7 are mounted, in the Y-axis direction only, and obtaining by comparing the shaking acceleration with the output signal of accelerometer 7. |
| $S_{xz}$ | Shaking the whole block, on which the accelerometer 5 and accelerometer 7 are mounted, in the Z-axis direction only, and obtaining by comparing the shaking acceleration with the output signal of accelerometer 7. |
| $S_{zx}$ | Shaking the whole block, on which the accelerometer 5 and accelerometer 7 are mounted, in the X-axis direction only, and obtaining by comparing the shaking acceleration with the output signal of accelerometer 5. |
| $S_{zy}$ | Shaking the whole block, on which the accelerometer 5 and accelerometer 7 are mounted, in the Y-axis direction only, and obtaining by comparing the shaking acceleration with the output signal of accelerometer 5. |
| $S_{zz}$ | Shaking the whole block, on which the accelerometer 5 and accelerometer 7 are mounted, in the Z-axis direction only, and obtaining by comparing the shaking acceleration with the output signal of accelerometer 5. |

It goes without saying that the outputs of the accelerometer and accelerometer 7 may be measured simultaneously.

In the Case of Three Uniaxial Acceleration Sensor (FIG. 4C)

Three uniaxial acceleration sensors 5, 7 and 8 are mounted on the mounting surface 6a, 6b and 6c of the cubical block 6, respectively. In this state, the direction of the main sensing axis of the acceleration sensor 5 is orthogonal to the mounting surface 6a of the cubical block 6 to which the acceleration sensor 5 is fixed; the direction of the main sensing axis of the acceleration sensor 7 is orthogonal to the mounting surface 6b of the cubical block 6 to which the acceleration sensor 7 is fixed; and the direction of the main sensing axis of the acceleration sensor 8 is orthogonal to the mounting surface 6c of the cubical block 6 to which the acceleration sensor 8 is fixed. As for the uniaxial acceleration sensors 5 and 7, their conditions are the same as those of FIG. 4B. As for the uniaxial acceleration sensor 8, its output axis, the main sensing axis direction, is defined as the Y-axis. On the other hand, as for its two axes orthogonal to the Y-axis, X-axis and Z-axis, the X-axis is defined as an axis that is orthogonal to the Y-axis and to the mounting surface 6b of the cubical block 6, and the Z-axis is defined as an axis that is orthogonal to the Y-axis and to the mounting surface 6a of the cubical block 6.

Accordingly, relationships between the X-, Y- and Z-axes of the uniaxial acceleration sensors 5 and 7 and the vibration direction of the table 12 of the vibration generator are the same as described above. Thus, the main axis sensitivity $S_{zz}(\omega)$ and transverse sensitivities $S_{zx}(\omega)$ and $S_{xz}(\omega)$ of the uniaxial acceleration sensor 5 and the main axis sensitivity $S_{xx}(\omega)$ and transverse sensitivities $S_{xy}(\omega)$ and $S_{xz}(\omega)$ of the uniaxial acceleration sensor 7 can be obtained in the same manner as described above.

In addition, the main axis sensitivity $S_{yy}(\omega)$ of the uniaxial acceleration sensor 8 can be obtained by mounting the opposite side to the mounting surface 6c of the cubical block 6 on the surface of the table 12 of the vibration generator 11, and by shaking the cubical block 6 by vibrating the table 12 of the vibration generator in the state in which the main sensing axis (Y-axis) of the uniaxial acceleration sensor 8 is aligned with the vibration direction of the table 12 of the vibration generator, that is, by shaking the cubic block 6 in the Y-axis direction among the coordinate axes of the coordinate system of the space defining the input acceleration.

Assume that the in put acceleration is represented by $a_{iy}\exp(j\omega t)$, and the output signal of the uniaxial acceleration sensor 8 is represented by $a_{oy}\exp(j\omega t)$, then the main axis sensitivity $S_{yy}(\omega)$ of the uniaxial acceleration sensor 8 is defined by the following expression.

$$S_{yy}(\omega) = \frac{a_{oy}\exp(j\omega t)}{a_{iy}\exp(j\omega t)} \quad (17)$$

Likewise, the transverse sensitivity $S_{yx}(\omega)$ of the uniaxial acceleration sensor 8 can be obtained by mounting the opposite side of the mounting surface 6b of the cubical block 6 on the surface of the table 12 of the vibration generator 11, and by shaking the cubical block 6 by vibrating the table 12 of the vibration generator in the state in which the X-axis of the uniaxial acceleration sensor 8 is aligned with the vibration direction of the table 12 of the vibration generator, that is, by shaking the cubic block 6 in the X-axis direction among the coordinate axes of the coordinate system of the space defining the input acceleration.

Assume that the input acceleration is represented by $a_{ix}\exp(j\omega t)$, and the output signal of the acceleration sensor 8 is represented by $a_{oy}\exp(j\omega t)$, then the sensitivity $S_{yx}(\omega)$ of the acceleration sensor 8 in the matrix sensitivity is defined by the following expression.

$$S_{yx}(\omega) = \frac{a_{oy}\exp(j\omega t)}{a_{ix}\exp(j\omega t)} \quad (18)$$

In addition, the transverse sensitivity $S_{yz}(\omega)$ of the uniaxial acceleration sensor 8 can be obtained by mounting the opposite side to the mounting surface 6a of the cubical block 6 on the surface of the table 12 of the vibration generator 11, and by shaking the cubical block 6 by vibrating the table 12 of the vibration generator in the state in which the Z-axis of the uniaxial acceleration sensor 8 is aligned with the vibration direction of the table 12 of the vibration generator, that is, by shaking the cubic block 6 in the Z-axis direction among the coordinate axes of the coordinate system of the space defining the input acceleration.

Assume that the input acceleration is represented by $a_{iz}\exp(j\omega t)$, and the output signal of the acceleration sensor 7 is represented by $a_{oy}\exp(j\omega t)$, then the sensitivity $S_{yz}(\omega)$ of the acceleration sensor 8 in the matrix sensitivity is defined by the following expression.

$$S_{yz}(\omega) = \frac{a_{oy}\exp(j\omega t)}{a_{iz}\exp(j\omega t)} \quad (19)$$

From the above, establishing the input and output relationships between the three uniaxial acceleration sensors gives the following expression (20) (the left side is the output, and the right side is the input).

$$\begin{pmatrix} V_{ox}\exp(j\omega t) \\ V_{oz}\exp(j\omega t) \\ V_{oy}\exp(j\omega t) \end{pmatrix} = \begin{pmatrix} S_{xx} & S_{xy} & S_{xz} \\ S_{zx} & S_{zy} & S_{zz} \\ S_{yx} & S_{yy} & S_{yz} \end{pmatrix} \begin{pmatrix} a_{ix}\exp(j\omega t) \\ a_{iy}\exp(j\omega t) \\ a_{iz}\exp(j\omega t) \end{pmatrix} \quad (20)$$

In summary, assuming that the matrix sensitivity is defined by the foregoing expression (20), the elements of the matrix can be obtained by the following procedures.

| Elements | Obtaining Procedure |
|---|---|
| $S_{xx}$ | Shaking the whole block, on which the accelerometers 5, 7 and 8 are mounted, in the X-axis direction only, and obtaining by comparing the shaking acceleration with the output signal of accelerometer 7. |
| $S_{xy}$ | Shaking the whole block, on which the accelerometers 5, 7 and 8 are mounted, in the Y-axis direction only, and obtaining by comparing the shaking acceleration with the output signal of accelerometer 7. |
| $S_{xz}$ | Shaking the whole block, on which the accelerometers 5, 7 and 8 are mounted, in the Z-axis direction only, and obtaining by comparing the shaking acceleration with the output signal of accelerometer 7. |
| $S_{yx}$ | Shaking the whole block, on which the accelerometers 5, 7 and 8 are mounted, in the X-axis direction only, and obtaining by comparing the shaking acceleration with the output signal of accelerometer 8. |
| $S_{yy}$ | Shaking the whole block, on which the accelerometers 5, 7 and 8 are mounted, in the Y-axis direction only, and obtaining by comparing the shaking acceleration with the output signal of accelerometer 8. |
| $S_{yz}$ | Shaking the whole block, on which the accelerometers 5, 7 and 8 are mounted, in the Z-axis direction only, and obtaining by comparing the shaking acceleration with the output signal of accelerometer 8. |
| $S_{zx}$ | Shaking the whole block, on which the accelerometers 5, 7 and 8 are mounted, in the X-axis direction only, and obtaining by comparing the shaking acceleration with the output signal of accelerometer 5. |
| $S_{zy}$ | Shaking the whole block, on which the accelerometers 5, 7 and 8 are mounted, in the Y-axis direction only, and obtaining by comparing the shaking acceleration with the output signal of accelerometer 5. |
| $S_{zz}$ | Shaking the whole block, on which the accelerometers 5, 7 and 8 are mounted, in the Z-axis direction only, and obtaining by comparing the shaking acceleration with the output signal of accelerometer 5. |

It goes without saying that the outputs of the accelerometers 5, 7 and 8 may be measured simultaneously when they are shaken in the same direction.

In the Case of Semiconductor Accelerometer (Including Gyroscopic Function And Angular Acceleration Measuring Function) (FIG. 4D)

The semiconductor acceleration sensor 9 cannot be considered as a combination of acceleration sensors having a single main sensing axis of the translational acceleration. In other words, it is impossible to examine the characteristics of the uniaxial acceleration sensors independently, and to examine the matrix sensitivity from the transverse sensitivity in the same manner as with the uniaxial acceleration sensors. In addition, as for the translational acceleration, there are only three main axes of the sensitivity at the maximum. In view of this, a coordinate system that defines the input acceleration is defined in terms of X-axis, Y-axis and Z-axis. When the number of the output axes of the semiconductor acceleration sensor 9 is one, OX (O is the origin of the coordinate system, which also applies to the following) is made an output axis. When the number of the output axes of the semiconductor acceleration sensor 9 is two, OX and OY are made output axes. When the number of the output axes of the semiconductor acceleration sensor 9 is three, OX, OY and OZ are made output axes.

Figure 12:
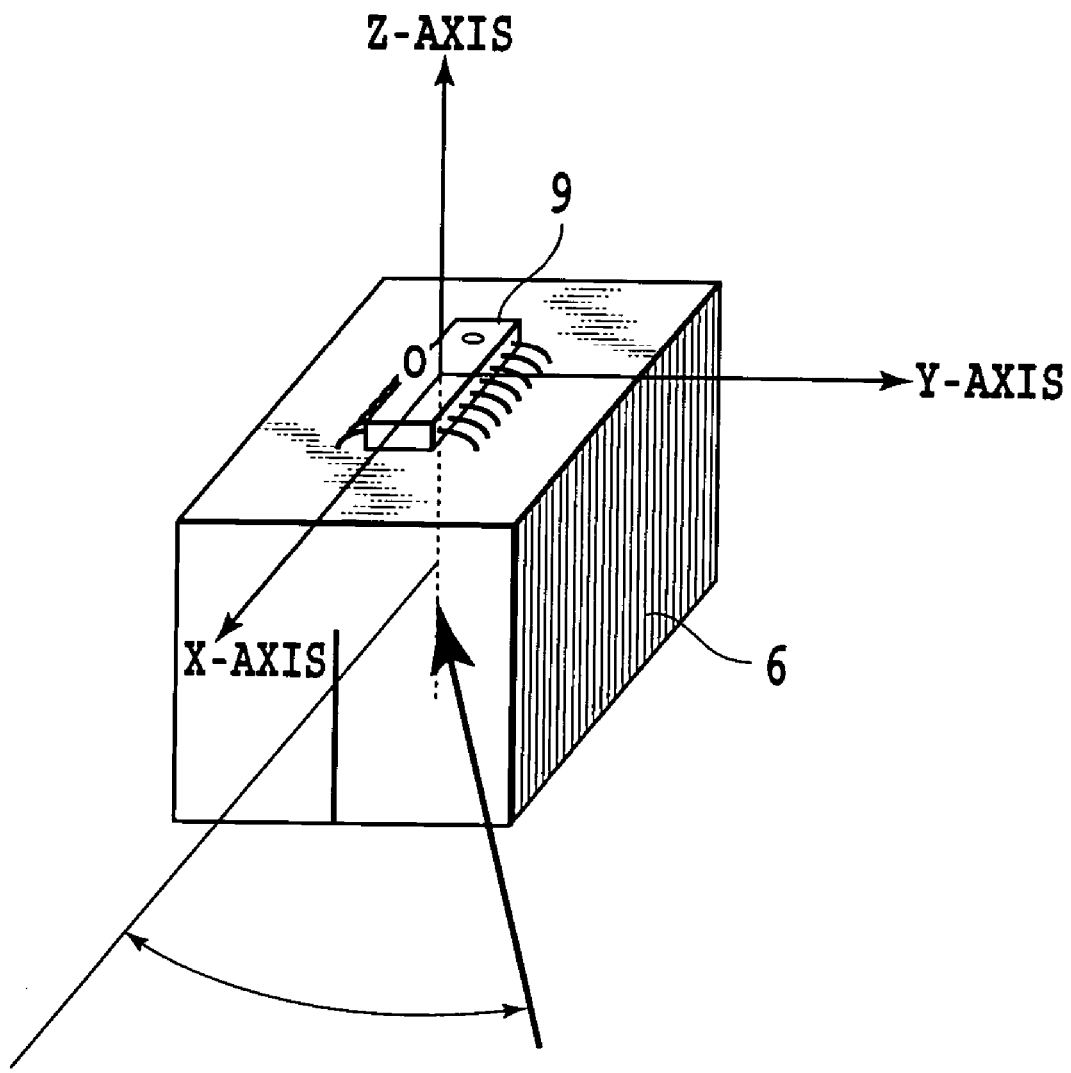
FIG. 12 is a diagram illustrating a manner of mounting a semiconductor acceleration sensor to a cubical block.
Figure 13:
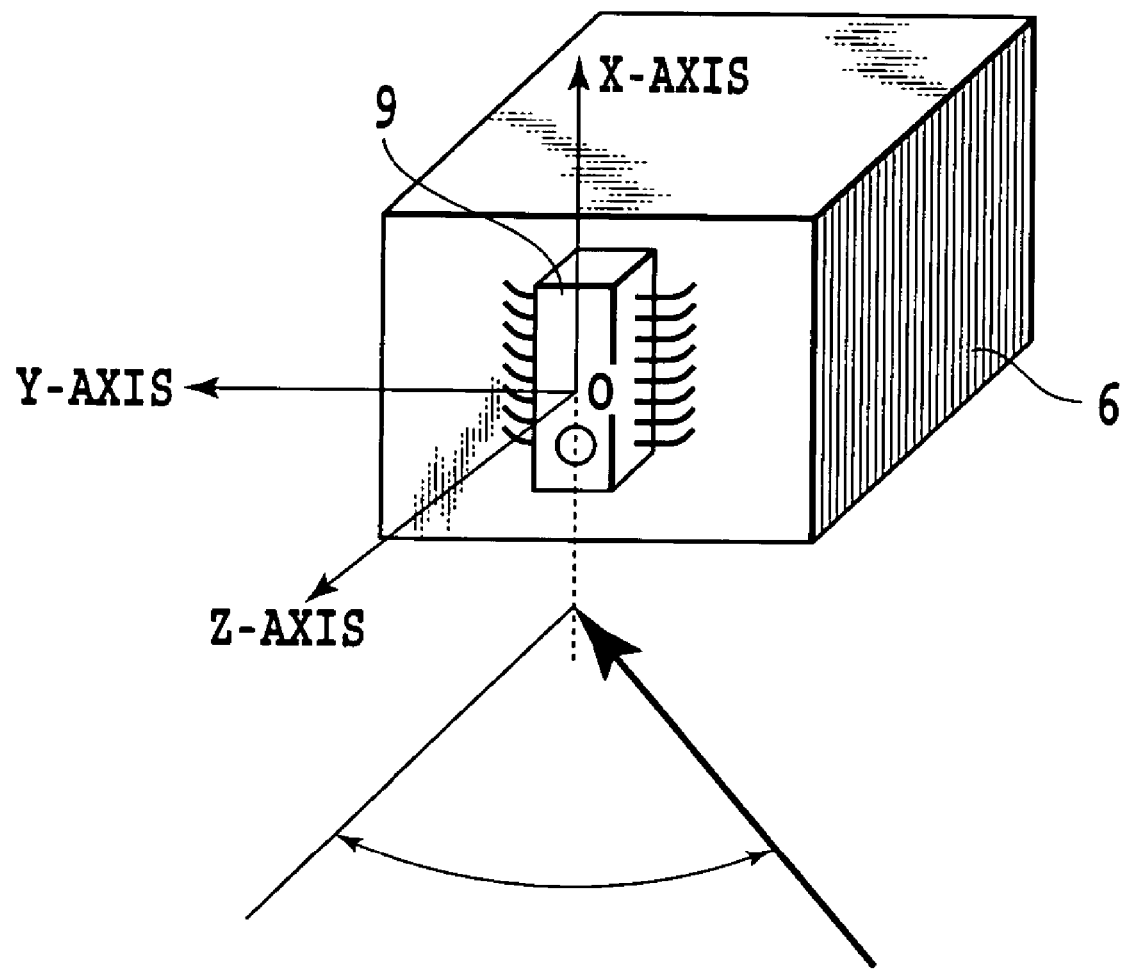
FIG. 13 is a diagram illustrating another manner of mounting the semiconductor acceleration sensor to the cubical block.
Figure 14:
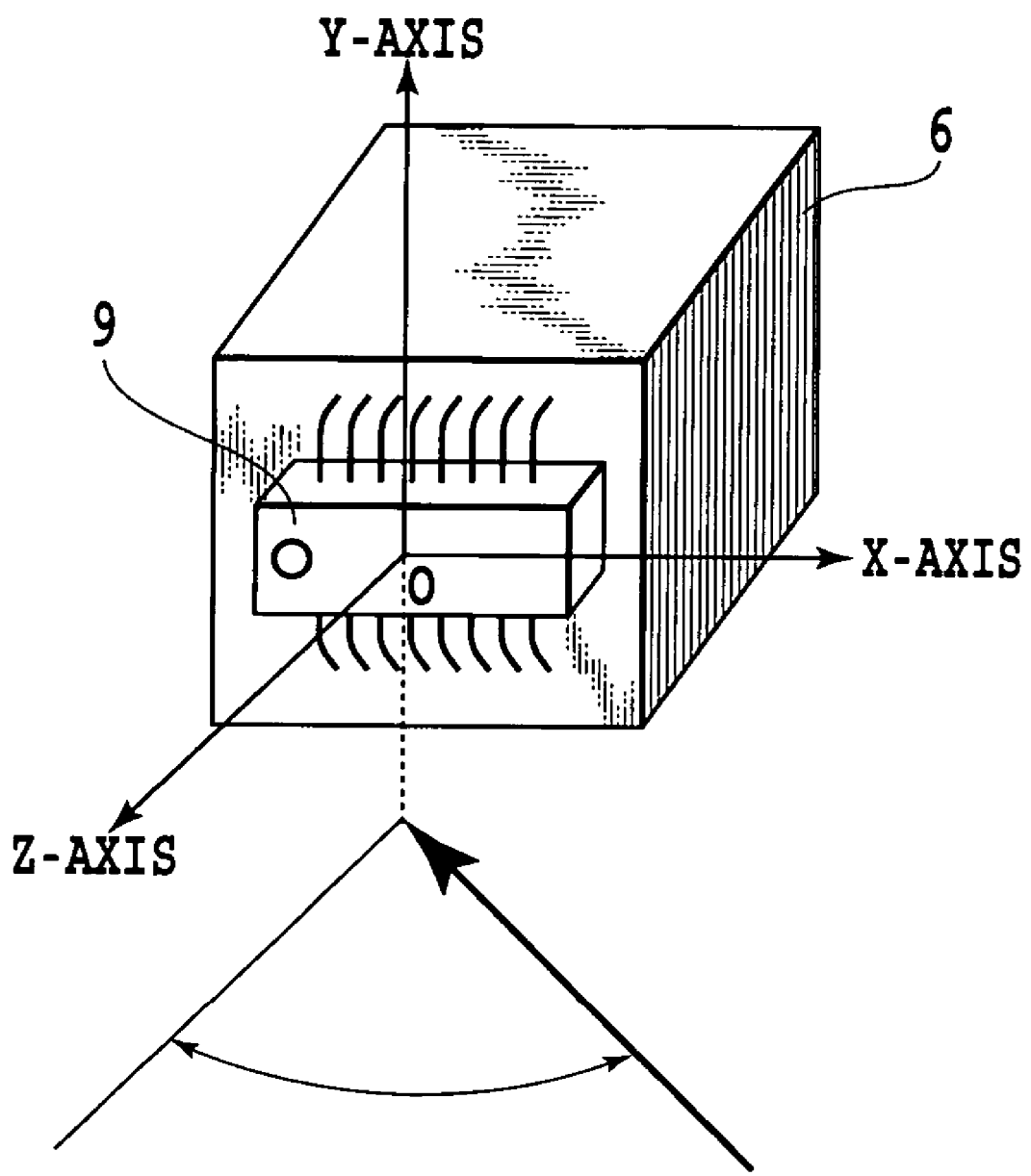
FIG. 14 is a diagram illustrating still another manner of mounting the semiconductor acceleration sensor to the cubical block.

The acceleration sensor 9 is mounted on the cubical block 6 serving as a jig as shown in FIG. 12-FIG. 14. The cubical block 6 is mounted on the surface of the table of the vibration generator. In this case, the main axis sensitivity and transverse sensitivity can be obtained by the following procedures. However, the output axis (main axis sensitivity) must always be perpendicular to the plane on which the shaking acceleration is present (that is, the surface of the table of the vibration generator). More specifically, the output axis is OZ when the Z-axis is perpendicular to the surface of the table of the vibration generator as shown in FIG. 12; the output axis is OX when the X-axis is perpendicular to the surface of the table of the vibration generator as shown in FIG. 13; and the output axis is OY when the Y-axis is perpendicular to the surface of the table of the vibration generator as shown in FIG. 14.

| Elements | Obtaining Procedure |
|---|---|
| $S_{xx}$ | Obtain sensitivity from X-axis output signal and shaking signal by sinusoidally shaking in X-axis direction. |
| $S_{xy}$ | Obtain sensitivity from X-axis output signal and shaking signal by sinusoidally shaking in Y-axis direction. |
| $S_{xz}$ | Obtain sensitivity from X-axis output signal and shaking signal by sinusoidally shaking in Z-axis direction. |
| $S_{yx}$ | Obtain sensitivity from Y-axis output signal and shaking signal by sinusoidally shaking in X-axis direction. |
| $S_{yy}$ | Obtain sensitivity from Y-axis output signal and shaking signal by sinusoidally shaking in Y-axis direction. |
| $S_{yz}$ | Obtain sensitivity from Y-axis output signal and shaking signal by sinusoidally shaking in Z-axis direction. |
| $S_{zx}$ | Obtain sensitivity from Z-axis output signal and shaking signal by sinusoidally shaking in X-axis direction. |
| $S_{zy}$ | Obtain sensitivity from Z-axis output signal and shaking signal by sinusoidally shaking in Y-axis direction. |
| $S_{zz}$ | Obtain sensitivity from Z-axis output signal and shaking signal by sinusoidally shaking in Z-axis direction. |

The sensitivity matrix can be defined by placing, as i-j components of the sensitivity matrix, the transverse sensitivities about the translational acceleration at right locations with considering the input and output correspondence in accordance with the obtaining method of the transverse sensitivity and with the definitions of the input acceleration vector and output signal vector. The method of defining the sensitivity matrix is the same as that of the foregoing "In the Case of Single Uniaxial Acceleration Sensor (FIG. 4A)" when the number of the output axes of the semiconductor acceleration sensor 9 is one; is the same as that of the foregoing "In the Case of Two Uniaxial Acceleration Sensors (FIG. 4B)" when the number of the output axes of the semiconductor acceleration sensor 9 is two; and is the same as that of the foregoing "In the Case of Three Uniaxial Acceleration Sensors (FIG. 4C)" when the number of the output axes of the semiconductor acceleration sensor 9 is three.

Incidentally, the detection accuracy of the acceleration can be improved in the case where the three uniaxial acceleration sensors are combined (FIG. 4C) or where the semiconductor acceleration sensor is used and the number of the output axes of the acceleration is three. More specifically, the following expression holds in these cases when considering only the translational acceleration in the three-dimensional space. The definitions of individual symbols are as described before.

$$\begin{pmatrix} a_{ox} \\ a_{oy} \\ a_{oz} \end{pmatrix} = \begin{pmatrix} S_{xx} & S_{xy} & S_{xz} \\ S_{yx} & S_{yy} & S_{yz} \\ S_{zx} & S_{zy} & S_{zz} \end{pmatrix} \begin{pmatrix} a_{ix} \\ a_{iy} \\ a_{iz} \end{pmatrix} \quad (21)$$

Here, to obtain the input acceleration $$\begin{pmatrix} a_{ix} \\ a_{iy} \\ a_{iz} \end{pmatrix}$$

from the output acceleration $$\begin{pmatrix} a_{ox} \\ a_{oy} \\ a_{oz} \end{pmatrix},$$

the output acceleration should be multiplied by the inverse matrix of the matrix sensitivity. Before that, the existence of the inverse matrix will be discussed.

Assume that $S_{xx}=S_{yy}=S_{zz}=S$, and all the transverse sensitivities are equal and given by $S_{xy}=S_{xz}=S_{yx}=S_{yz}=S_{zx}=S_{zy}=\epsilon \times S$, then the following expression holds. Thus, multiplying the output signal by the inverse matrix of the matrix sensitivity makes it possible to obtain the input signal at higher accuracy.

$$\det \begin{pmatrix} S_{xx} & S_{xy} & S_{xz} \\ S_{yx} & S_{yy} & S_{yz} \\ S_{zx} & S_{zy} & S_{zz} \end{pmatrix} = \begin{vmatrix} S & \epsilon S & \epsilon S \\ \epsilon S & S & \epsilon S \\ \epsilon S & \epsilon S & S \end{vmatrix} \quad (22)$$

$$= S^3 \begin{vmatrix} 1 & \epsilon & \epsilon \\ \epsilon & 1 & \epsilon \\ \epsilon & \epsilon & 1 \end{vmatrix}$$

$$= S^3 (\epsilon - 1)^2 (2\epsilon + 1) \neq 0$$

Generally, it is reasonable to assume that $\epsilon \leq 1$ because the ratio of the transverse sensitivity to the main axis sensitivity is less than one. Then, the inverse matrix of the matrix sensitivity is considered to exist from the expression (22).

Measurement of Input Acceleration to Uniaxial Acceleration Sensor

Figure 15:
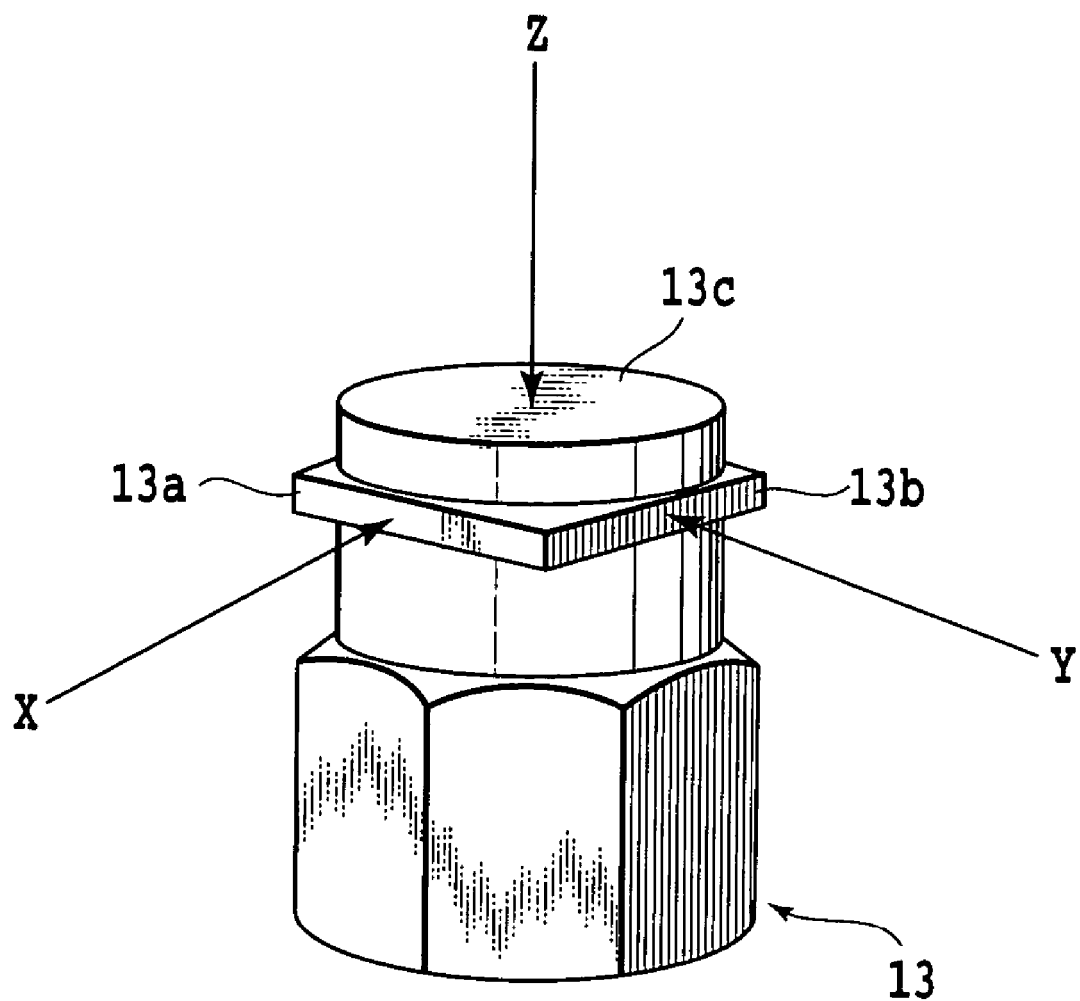
FIG. 15 is a diagram illustrating another example of the acceleration sensor.

The input acceleration to the uniaxial acceleration sensor can be measured by directly irradiating the uniaxial acceleration sensor with the laser from a laser interferometer. Some (casing) structures of the uniaxial acceleration sensor to achieve this will be described. As shown in FIG. 15, the lower part of the uniaxial acceleration sensor 13 with a common structure has a nut-like shape to be screwed into an object subject to detection, and the upper part thereof has a cylindrical section. The top surface 13c of the uniaxial acceleration sensor 13 with the common structure is flat and is orthogonal to the axis, and can be irradiated with the laser from the laser interferometer. Thus, the top surface 13c of the uniaxial acceleration sensor 13 can be perpendicularly irradiated with the laser whose optical path is aligned with one of the X-, Y- and Z-axes (Z-axis, for example) of the coordinate system of the space defining the input acceleration. In addition, projecting portions 13a and 13b are formed on the side of the part with the cylindrical section of the uniaxial acceleration sensor 13. The two projecting portions 13a and 13b undergo processing (such as cutting with sufficiently high accuracy) in such a manner that they have flat surfaces with an angle of 90 degrees. In addition, the flat surfaces of the two projecting portions 13a and 13b are processed in such a manner as to become orthogonal to the axes of the uniaxial acceleration sensor 13. Accordingly, the flat surfaces of the projecting portions 13a and 13b can be perpendicularly irradiated with the lasers from the laser interferometer whose optical paths are aligned with the remaining two axes (X and Y-axes). Thus, the optical paths of the lasers irradiating the projecting portions 13a and 13b and the top surface 13c can be aligned with the X-, Y- and Z-axes at high accuracy. The structure is applicable to the case where only a single uniaxial acceleration sensor is employed.

Figure 16A:
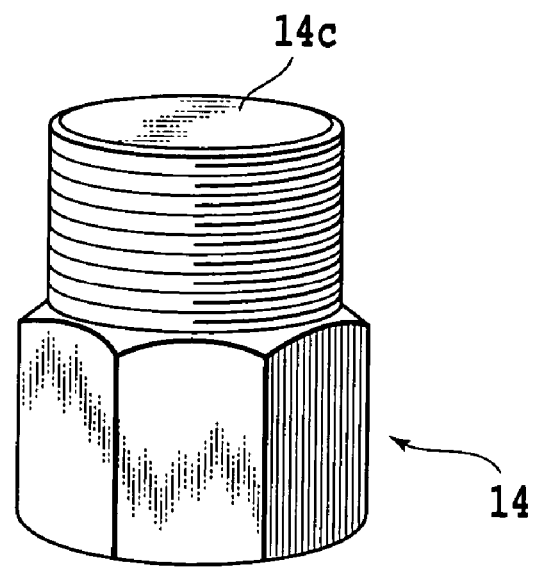
FIG. 16A is a diagram illustrating still another example of the acceleration sensor.
Figure 16B:
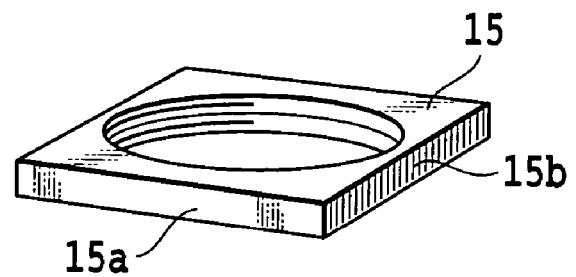
FIG. 16B is a diagram illustrating still another example of the acceleration sensor.
Figure 16C:
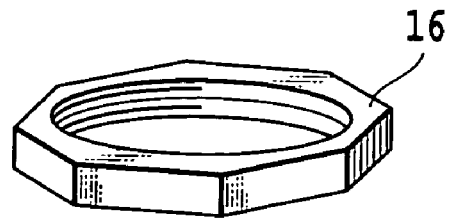
FIG. 16C is a diagram illustrating still another example of the acceleration sensor.

Alternatively, as shown in FIG. 16A, a screw thread is cut on the side of the portion with the cylindrical section of the uniaxial acceleration sensor 14. Then, ring-shaped part 15 and part 16 as shown in FIGS. 16B and 16C are screwed onto the screw thread portion. The part 15 undergoes processing (such as cutting with sufficiently high accuracy) in such a manner that its two adjacent outer sides 15a and 15b have flat surfaces with an angle of 90 degrees. The flat surfaces of the two sides 15a and 15b are processed in such a manner as to become orthogonal to the axes of the uniaxial acceleration sensor 14 in the state in which it is screwed onto the portion with the cylindrical section of the uniaxial acceleration sensor 14. The other part 16, which makes contact with the part 15 to fasten it to the sensor 14, can be fixed in place after determining the position of the part 15 around the axis of the uniaxial acceleration sensor 14. The top surface 14c of the uniaxial acceleration sensor 14, which is flat and orthogonal to the axis, can be irradiated with the laser from the laser interferometer. Such a structure enables the input-output optical path of the laser, with which the top surface 14c of the uniaxial acceleration sensor 14 is irradiated perpendicularly, to align with one of the X-, Y- and Z-axes (Z-axis, for example) of the coordinate system of the space defining the input acceleration. In addition, adjusting the position of the part 15 around the axis of the uniaxial acceleration sensor 14 enables the optical path of the laser from the laser interferometer, with which the flat surfaces of the two sides 15a and 15b of the part 15 are irradiated perpendicularly, to align with the two remaining axes (X and Y-axes) of the coordinate system of the space defining the input acceleration. Accordingly, the uniaxial acceleration sensor 14 as shown in FIGS. 16A-16C is applicable to the case where two or three uniaxial acceleration sensors are combined as in FIG. 4B or 4C.

As for uniaxial acceleration sensors other than the uniaxial acceleration sensors with the common structures as shown in FIG. 15 and FIGS. 16A-16C, if no restrictions are imposed on their outer shapes, it is possible to form, on parts of the outer shapes, laser radiation surfaces which are perpendicular to the X-axis, Y-axis and Z-axis of the coordinate system of the space defining the input acceleration. In addition, as for the semiconductor acceleration sensor, those with the same structures can be constructed.

In the Case of Considering Effect of Angular Acceleration and Angular Velocity Furthermore, when obtaining the sensitivity matrix of the foregoing sensors, it is possible to consider the effect of the rotation about the rotational axis of the sensor.

A structure of the casing of a sensor for achieving this will be described below.

Figure 17:
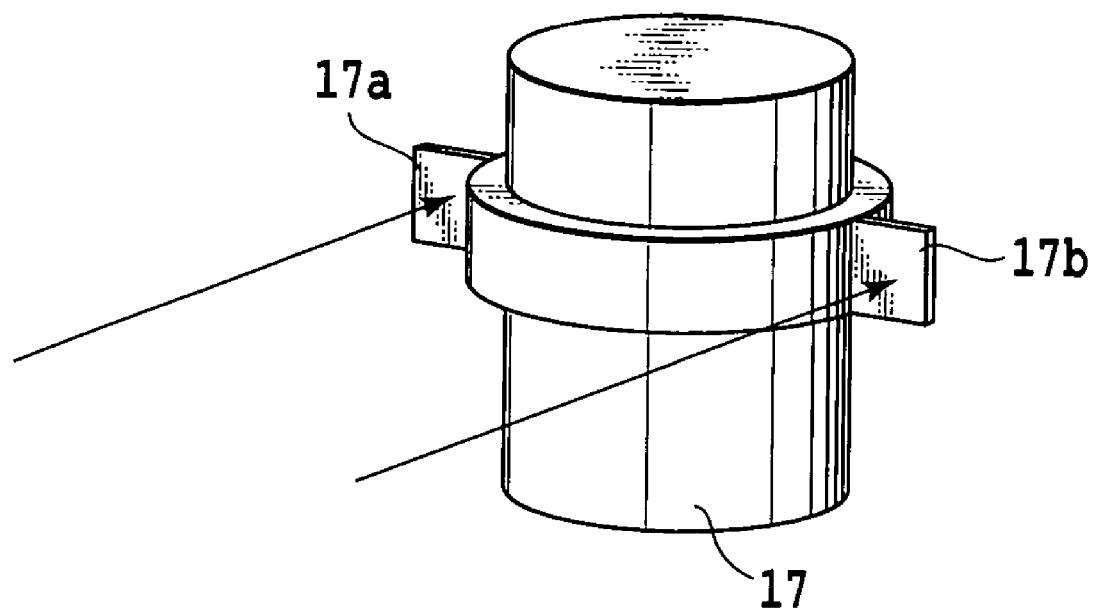
FIG. 17 is a diagram illustrating a structure of a casing of the sensor.

FIG. 17 shows a sensor 17 whose casing has planes 17a and 17b formed on an imaginary plane including its rotational axis (main sensing axis in this case). It has such a structure that enables the two planes 17a and 17b to be irradiated with lasers from two laser interferometers, respectively. Such a structure makes it possible, when mounting the sensor 17 on the cubical block in such a manner that the rotational axis of the sensor 17 is aligned with the center of rotation of the uniaxial vibration generator for generating the rotational vibration motion (this also applies to the following description), and when applying the rotational vibration motion and calculating the transverse sensitivity of the sensor in each example described above, to refer to the output value of the sensor obtained by the application and to the measurement values of the angular velocity vibration or angular acceleration vibration obtained by irradiating the two planes 17a and 17b with the lasers from the two laser interferometers at the application. The planes 17a and 17b have indicators such as a scale to make clear the distance from the rotational axis of the sensor 17 to the laser radiation points on the planes 17a and 17b, which is necessary for calculating the measurement values by the laser interferometers.

The example shows only a basic structure. The planes 17a and 17b can be formed on the side of the sensor 17 through a cutting process, for example.

Figure 18A:
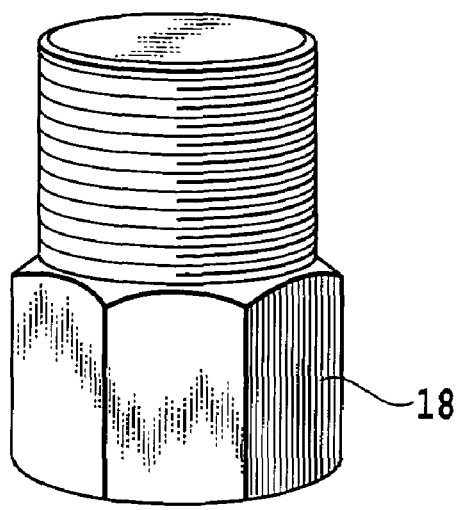
FIG. 18A is a diagram illustrating a structure of another sensor.
Figure 18B:
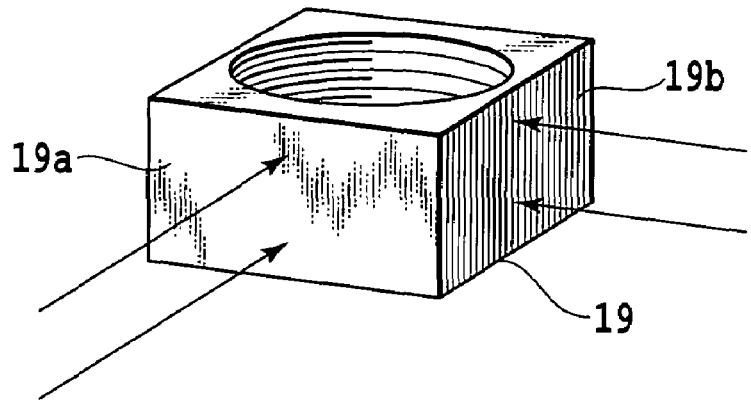
FIG. 18B is a diagram illustrating a structure of another sensor.
Figure 18C:
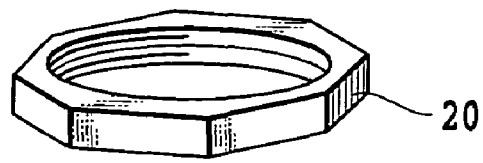
FIG. 18C is a diagram illustrating a structure of another sensor.

In addition, the laser radiation plane can be placed on a plane parallel to the rotational axis rather than on the plane including the rotational axis. FIGS. 18A-18C shows a sensor with a structure having such a plane. First, as shown in FIG. 18A, a screw thread is cut on the side of the portion with the cylindrical section of the sensor 18. Then, a ring-shaped part 19 and part 20 as shown in FIGS. 18B and 18C are screwed onto the screw thread portion. The part 19 undergoes processing (such as cutting with sufficiently high accuracy) in such a manner that its two adjacent outer sides 19a and 19b have flat surfaces which are located on planes parallel to the rotational axis when the part 19 is screwed onto the sensor 18 and which make an angle of 90 degrees. The other part 20, which makes contact with the part 19 to fasten it to the sensor 18, can be fixed in place after determining the position of the part 19 around the axis of the uniaxial acceleration sensor 18. Such a structure makes it possible, when mounting the sensor 18 on the cubical block in such a manner that the rotational axis of the sensor 18 is aligned with the center of rotation of the uniaxial vibration generator for generating the rotational vibration motion, and when applying the rotational vibration motion and calculating the transverse sensitivity of the sensor in each example described above, to refer to the output value of the sensor 18 obtained by the application and to the measurement values of the angular velocity or angular acceleration obtained by irradiating the two positions on the planes 19a and 19b with the lasers from the two laser interferometers at the application. The planes 19a and 19b have indicators such as a scale thereon to make clear the distance from the rotational axis of the sensor 18 to the plane 19a and 19b, and the geometrical relationships between the laser radiation point on the plane 19a and 19b and the rotational axis of the sensor 18 to calculate the measurement values by the laser interferometers. In addition, the planes 19a and 19b of the example are thicker in the direction of the main sensing axis of the sensor 18, thereby enabling the lasers from the two laser interferometers to irradiate two points in the direction of the main sensing axis of the sensor 18 on each plane. In this case, it is possible to examine the effect of the angular velocity and angular acceleration about the rotational axes other than the main sensing axis of the sensor 18.

Figure 19A:
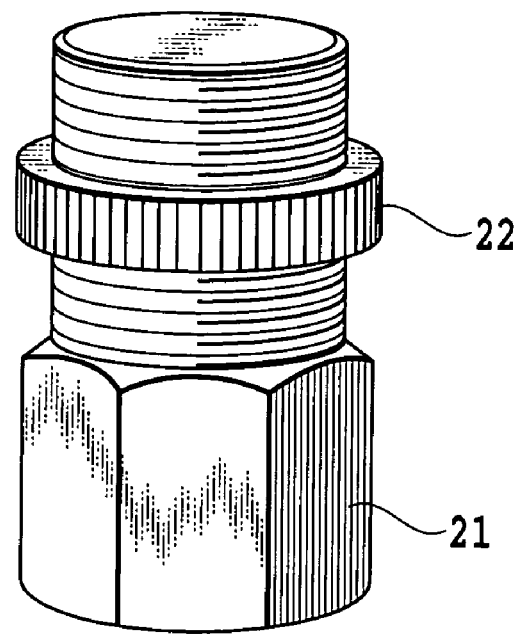
FIG. 19A is a diagram illustrating structures of another sensor.
Figure 19B:
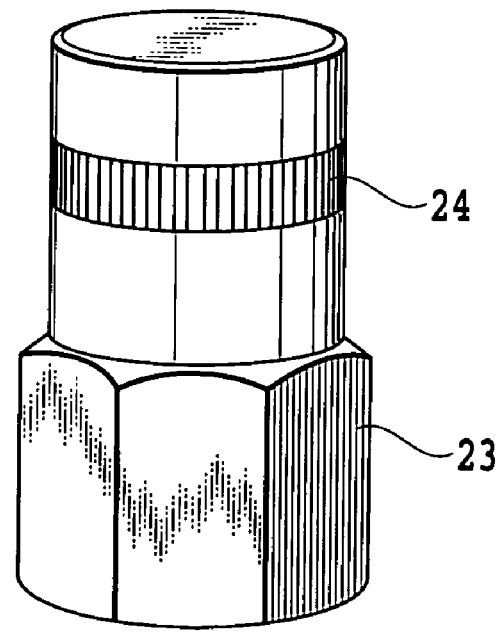
FIG. 19B is a diagram illustrating structures of another sensor.

Furthermore, as shown in FIGS. 19A and 19B, such a structure is also possible which has a diffraction grating around the rotational axis of the sensor. FIG. 19A shows an example in which a screw thread is cut on the side of the portion with the cylindrical section of the sensor 21, and a ring-like part 22, which has a diffraction grating formed on the outer surface thereof, is screwed onto the screw thread portion. FIG. 19B is an example having a diffraction grating 24 formed on the side of the sensor 23 and around its axis through cutting or the like. It becomes possible, by mounting the sensor 21 or 23 with such a structure on the cubical block in such a manner that the rotational axis of the sensor is aligned with the center of rotation of the uniaxial vibration generator for generating the rotational vibration motion, and by applying the rotational vibration motion, to refer to the output value of the sensor 21 or 23 obtained by the application, and to the measurement values of the angular velocity or angular acceleration obtained by irradiating the diffraction grating 22 or 24 with the lasers from the two laser interferometers at the application when calculating the transverse sensitivity of the sensor in each example described above.

Figure 20:
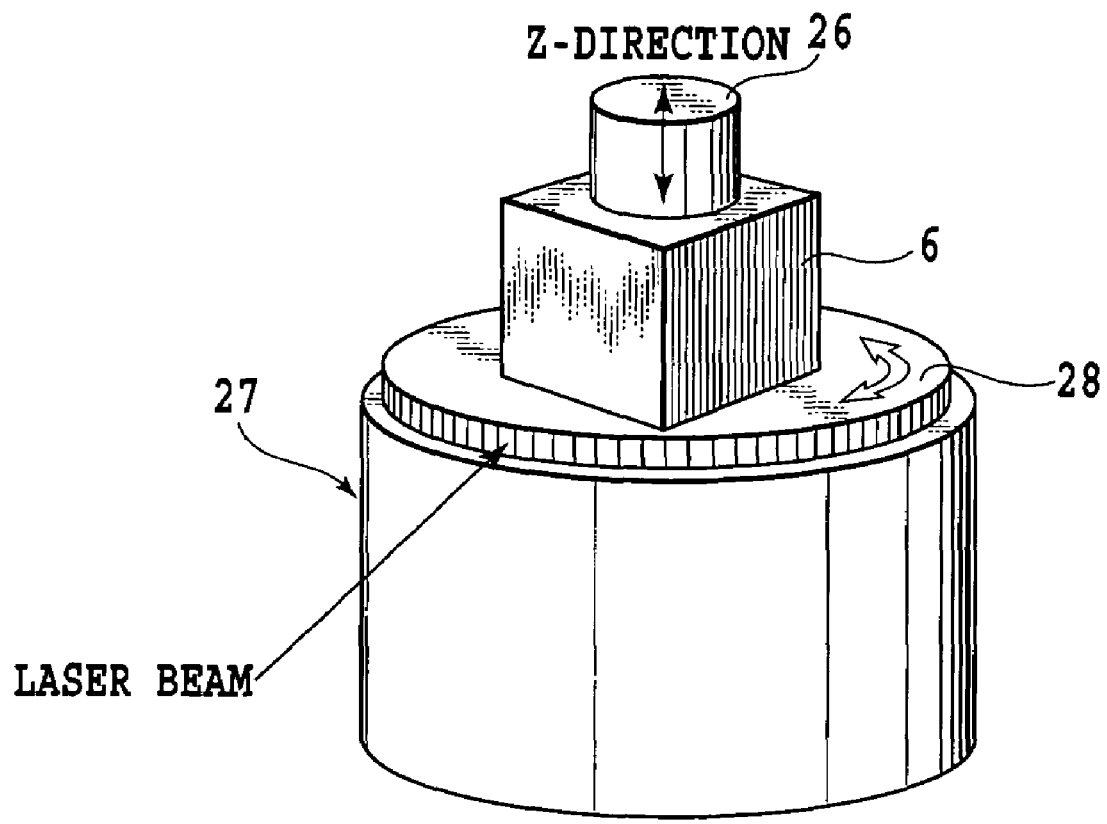
FIG. 20 is a diagram illustrating a manner of mounting a uniaxial angular acceleration sensor to a uniaxial vibration generator for generating the vibration angular acceleration for measuring the main axis sensitivity of the uniaxial angular acceleration sensor.

In the Case of Measuring Transverse Sensitivity of Acceleration Sensor for Detecting Angular Velocity and Angular Acceleration FIG. 20 shows a calibration method of a uniaxial angular acceleration sensor corresponding to the calibration method of the uniaxial translational acceleration sensor as shown in FIG. 7. In FIG. 20, the reference numeral 26 designates an angular acceleration sensor, 6 designates its mounting block, and 27 designates a uniaxial vibration generator for generating vibration angular acceleration. A disk-shaped table 28 carries out rotational vibration in the direction of the two-directional arrow in FIG. 20 with respect to the body of the uniaxial vibration generator 27. A table 28 has an optical diffraction grating formed on its side. The uniaxial vibration generator 27 produces the vibration angular acceleration about the sensing axis of the angular acceleration sensor, whose direction is indicated by the two-directional arrow ↔. To measure the vibration angular acceleration of the table 28, that is, the vibration angular acceleration applied to the angular acceleration sensor 26 mounted on the table 28 via the mounting block 6, the optical diffraction grating on the side of the table 28 is irradiated with the laser from the laser interferometer horizontally. To make the sensing axis of the angular acceleration sensor 26 perpendicular to the mounting surface of the table, the individual surfaces of the mounting block must have high flatness, and make accurate right angles with other surfaces. In addition, when the angular acceleration sensor 26 shown in FIG. 20 is set on the table of the uniaxial translational vibration acceleration generator that vibrates in the vertical direction as shown in FIG. 7, the sensing axis aligns with the direction of the translational acceleration. Accordingly, the transverse sensitivity can be measured which relates to the translational vibration acceleration in the sensing axis direction.

As for a multi-axial acceleration sensor or as for a multi-axial motion sensor for detecting the translational acceleration and angular velocity simultaneously, the sensor sensitivity concerning the angular acceleration or angular velocity about its axis can be determined by aligning the sensing axis of the angular acceleration or angular velocity with the axis of the rotational motion of the vibration generator. By setting the sensor on the uniaxial translational motion vibration generator as shown in FIG. 7, and by applying the translational motion vibration acceleration in parallel with the sensing axis of the rotational motion, the transverse sensitivity of the translational motion with respect to the sensing axis can be measured. As for the acceleration sensor having the sensitivity for the translational motion only, although the transverse sensitivity gives a lateral impression physically, the rotational motion does not. It means transverse sensitivity only in the sense of nondiagonal components of the sensitivity matrix.

Figure 21:
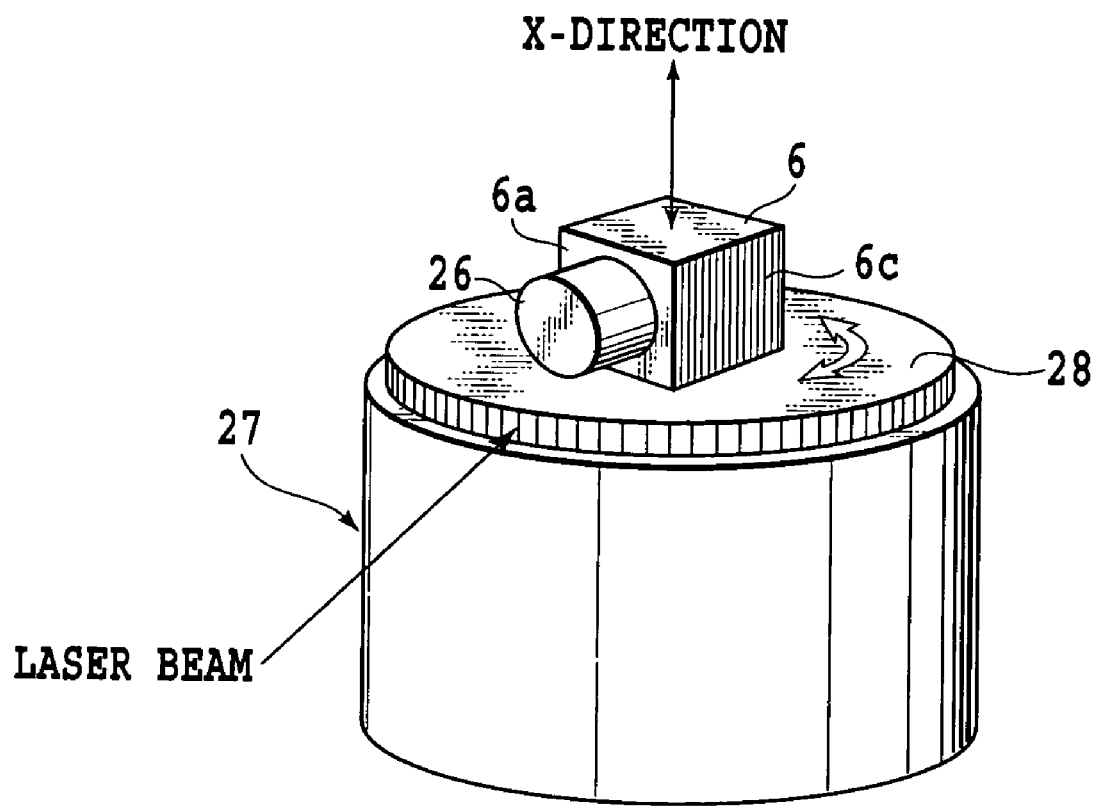
FIG. 21 is a diagram illustrating another manner of mounting the uniaxial angular acceleration sensor on the cubical block in a simpler fashion.

FIG. 21 shows an example that measures the transverse sensitivity by applying rotational vibration motion about the X-axis perpendicular to the sensing axis of the uniaxial angular acceleration sensor or angular velocity sensor, and by obtaining the output signal resulting from the application of the angular acceleration or angular velocity. In FIG. 21, the reference numeral 26 designates an angular acceleration sensor, 6 designates its mounting block, and 28 designates a mounting table having a diffraction grating formed on its side. A uniaxial vibration generator 27 produces the angular vibration acceleration about the sensing axis of the angular acceleration sensor, whose direction is indicated by the two-directional arrow ↔. It should be noted that the transverse sensitivity values can change depending on the location of the rotational axis for applying the rotational vibration motion. If the rotational axis is set on the vibration generator of the uniaxial translational motion in exactly the same manner as shown in FIG. 10, the transverse sensitivity associated with the angular acceleration sensor can be measured when the translational vibration acceleration in the X-axis direction operates as the input acceleration.

As for a multi-axial acceleration sensor or as for a multi-axial motion sensor for detecting the translational acceleration and angular velocity simultaneously, the sensor sensitivity concerning the angular acceleration or angular velocity about its axis can be determined by making the sensing axis of the angular acceleration or angular velocity perpendicular to the axis of the rotational motion of the vibration generator. The transverse sensitivity of the translational motion with respect to the sensing axis can be measured by setting the sensor on the uniaxial translational motion vibration generator as shown in FIG. 10 and by applying the translational motion vibration acceleration perpendicular to the sensing axis with respect to the rotational motion. As for the acceleration sensor having the sensitivity for the translational motion only, although the transverse sensitivity gives a lateral impression physically, the rotational motion does not. It means transverse sensitivity only in the sense of nondiagonal components of the sensitivity matrix. As for the sensing axis—be it of the translational motion acceleration, or of the angular acceleration or angular velocity—, it is not always necessary for the applying direction when applying acceleration in the direction perpendicular to the sensing axis, or for the central axis of the rotation, to be aligned with one of the input axes of applying acceleration. For example, assume that a biaxial acceleration sensor for detecting the translational acceleration has the X-input axis and Y-input axis. In this case, the transverse sensitivity can be defined by applying the angular acceleration about the Z-axis, to say nothing of the sensitivity measurement of the translational vibration acceleration along the X-axis and the translational vibration along the Y-axis. In this case, since the matrix sensitivity of the biaxial acceleration sensor in the three-dimensional space is found, a 2×3 sensitivity matrix is obtained.

Figure 22:
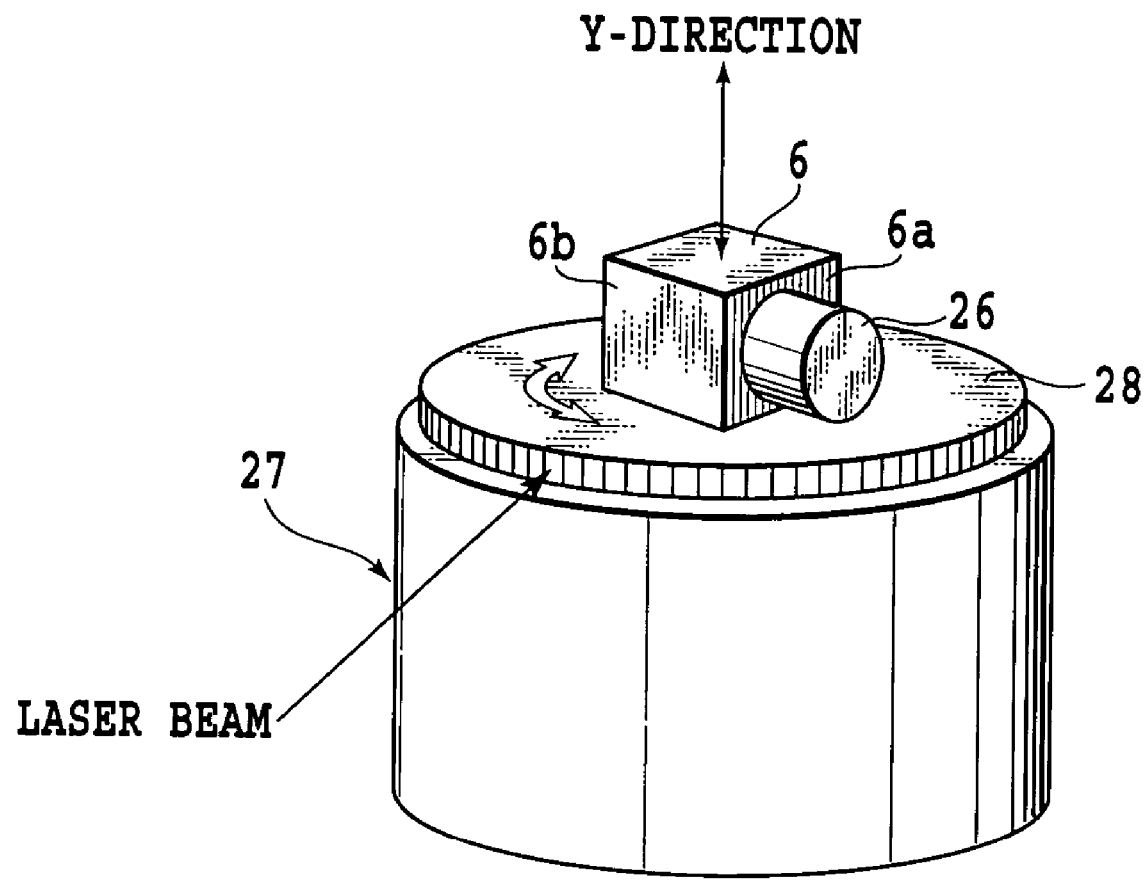
FIG. 22 is a diagram illustrating still another manner of mounting the uniaxial angular acceleration sensor on the cubical block in a simpler fashion.

FIG. 22 shows an example that measures the transverse sensitivity by applying rotational vibration motion about the Y-axis perpendicular to the sensing axis of the uniaxial angular acceleration sensor or angular velocity sensor, and by obtaining the output signal resulting from the application of the angular acceleration or angular velocity. In FIG. 22, the reference numeral 26 designates an angular acceleration sensor, 6 designates its mounting block, 27 designates a uniaxial vibration generator for generating the vibration angular acceleration, and 28 designates a mounting table having a diffraction grating formed on its side. The uniaxial vibration generator 27 produces the angular vibration acceleration about the sensing axis of the angular acceleration sensor, whose direction is indicated by the two-directional arrow ↔. It should be noted that the transverse sensitivity values can change depending on the location of the rotational axis for applying the rotational vibration motion. If the rotational axis is set on the vibration generator of the uniaxial translational motion in exactly the same manner as shown in FIG. 11, the transverse sensitivity associated with the angular acceleration sensor can be measured when the translational vibration acceleration in the Y-axis direction operates as the input acceleration.

As for the sensing axis—be it of the translational motion acceleration or of the angular acceleration or angular velocity—, it is not always necessary for the applying direction when applying acceleration in the direction perpendicular to the sensing axis, or for the central axis of the rotation, to be aligned with one of the input axes of applying acceleration. For example, assume that a biaxial acceleration sensor for detecting the translational acceleration has the X-input axis and Y-input axis. In this case, the transverse sensitivity can be defined by applying the angular acceleration about the Z-axis, to say nothing of the sensitivity measurement of the translational vibration acceleration along the X-axis and the translational vibration along the Y-axis. In this case, since the matrix sensitivity of the biaxial acceleration sensor in the three-dimensional space is found, a 2×3 sensitivity matrix is obtained.

The invention claimed is:

1. A method of measuring transverse sensitivity of a sensor for detecting acceleration comprising:
    applying vibration acceleration to at least one sensor which is fixed, via a jig, on a uniaxial vibration generator for generating rotational vibration motion, and which detects acceleration based on said rotational vibration motion;
    calculating transverse sensitivity from an output value of said sensor obtained by the application of the vibration acceleration, and from a measurement value of input acceleration to said sensor obtained by measuring the input acceleration with a measuring instrument independent of said sensor during the application; and
    generating a sensitivity matrix based on the transverse sensitivity, the calculated transverse sensitivity being an element of the sensitivity matrix,
    wherein the application is carried out in a state in which a coordinate axis of a coordinate system of a space defining the input acceleration to said sensor is aligned with a direction of a rotational axis of the vibration by adjusting said jig, the coordinate axis corresponding to a sensing axis of said sensor.

2. The method of measuring transverse sensitivity of a sensor as claimed in claim 1, wherein the calculated transverse sensitivity is a complex number expressed as a function of angular frequency based on the input acceleration and the output value.

3. A method of measuring transverse sensitivity of a sensor for detecting acceleration comprising:

applying vibration acceleration to a sensor which is fixed, via a jig, on a uniaxial vibration generator for generating rotational vibration motion, and which detects at least one of translational acceleration, rotational angular velocity and rotational angular acceleration based on said rotational vibration motion;

calculating transverse sensitivity, from an output value of said sensor obtained by the application of the vibration acceleration, and from a measurement value of input acceleration to said sensor obtained by measuring with a measuring instrument independent of said sensor during the application; and generating a sensitivity matrix based on the transverse sensitivity, the calculated transverse sensitivity being an element of the sensitivity matrix, wherein the application is carried out in a state in which coordinate axis of a three-axis Cartesian coordinate system of a space defining the input acceleration to said sensor is aligned with a direction of a rotational axis of the vibration by adjusting said jig, the coordinate axis corresponding to a sensing axis of said sensor.

4. The method of measuring transverse sensitivity of a sensor as claimed in claim 2, wherein the transverse sensitivity is obtained by dividing the output value with the input acceleration.

5. The method of measuring transverse sensitivity of a sensor as claimed in claim 3, wherein the calculated transverse sensitivity is a complex number expressed as a function of angular frequency based on the input acceleration and the output value.

6. The method of measuring transverse sensitivity of a sensor as claimed in claim 5, wherein the function is obtained by dividing the of output value with the input acceleration.

7. The method of measuring transverse sensitivity of a sensor as claimed in claim 3, wherein said sensor is subjected to rotational vibration motion and said sensor is also subjected to linear vibration motion, and wherein the measuring instrument generates the measurement value by measuring a motion based on said rotational vibration motion and said linear vibration motion.

8. An acceleration measuring method comprising: when obtaining N components of acceleration by combining N sensors for detecting acceleration (N is an integer equal to or greater than two), improving detection accuracy of the acceleration by multiplying an output of each sensor by an inverse matrix of a sensitivity matrix composed of main axis sensitivity and transverse sensitivity of the sensor, which are obtained by applying the method as defined in any one of claims 1 and 3 to the sensor.

9. An acceleration measuring method comprising: when obtaining acceleration with a sensor for detecting at least biaxial acceleration, improving detection accuracy of the acceleration by multiplying an output of the sensor by an inverse matrix of a sensitivity matrix composed of main axis sensitivity and transverse sensitivity of the sensor, which are obtained by applying the method as defined in any one of claims 1 and 3 to the sensor.

* * * * *